(12) United States Patent
Nale

(10) Patent No.: US 12,524,357 B2
(45) Date of Patent: Jan. 13, 2026

(54) BUFFER COMMUNICATION FOR DATA BUFFERS SUPPORTING MULTIPLE PSEUDO CHANNELS

(71) Applicant: Intel Corporation, Santa Clara, CA (US)

(72) Inventor: Bill Nale, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 760 days.

(21) Appl. No.: 17/710,813

(22) Filed: Mar. 31, 2022

(65) Prior Publication Data

US 2022/0229790 A1 Jul. 21, 2022

(51) Int. Cl.
*G06F 13/16* (2006.01)
*G06F 13/40* (2006.01)

(52) U.S. Cl.
CPC ...... *G06F 13/1673* (2013.01); *G06F 13/1626* (2013.01); *G06F 13/1689* (2013.01); *G06F 13/409* (2013.01)

(58) Field of Classification Search
CPC ............ G06F 13/1673; G06F 13/1626; G06F 13/1689; G06F 13/409; G06F 13/1684; G11C 11/4076; G11C 2207/2254
See application file for complete search history.

(56) References Cited

U.S. PATENT DOCUMENTS

| | | |
|---|---|---|
| 2019/0259435 A1 | 8/2019 | Ware et al. |
| 2019/0267060 A1* | 8/2019 | Kim ...................... G11C 11/34 |
| 2019/0340141 A1 | 11/2019 | Patel et al. |
| 2021/0191630 A1 | 6/2021 | Carlough et al. |
| 2021/0343318 A1 | 11/2021 | Shallal et al. |
| 2021/0357131 A1 | 11/2021 | Shallal et al. |
| 2021/0397554 A1 | 12/2021 | Ware |

* cited by examiner

*Primary Examiner* — Charles J Choi
(74) *Attorney, Agent, or Firm* — Compass IP Law PC

(57) ABSTRACT

A memory module has data buffers coupled to a registered clock driver (RCD) via buffer communication (BCOM) bus. The memory module includes memory devices managed as a first pseudo channel and a second pseudo channel. The data buffers manage data transmission between the memory devices and a host based on commands received over the BCOM bus. The RCD can send a first BCOM command on the BCOM bus to the data buffer, the first BCOM command to specify a rank and a burst length for the first pseudo channel. The RCD can send a second BCOM command on the BCOM bus to the data buffer, the second BCOM command to specify a rank and a burst length for the second pseudo channel, and a timing offset relative to the first BCOM command.

20 Claims, 13 Drawing Sheets

PS[0] AND PS[1] COMMANDS ON SAME CLOCK

PS[1] COMMAND ONE CLOCK AFTER PS[0] COMMAND

PS[1] COMMAND TWO CLOCKS AFTER PS[0] COMMAND

PS[1] COMMAND THREE CLOCKS AFTER PS[0] COMMAND

TABLE 310

| | TRANSFER | BCOM BIT | INDICATOR | VALUE |
|---|---|---|---|---|
| 312 | 1 | 2 | CMD SELECT | 0 = RD/WR; 1 = NON-DATA CMD |
| 314 | 1 | 1 | PS[0] SELECT | 0 = PS[0] NOT SELECTED; 1 = PS[0] SELECTED |
| 316 | 1 | 0 | RD/WR SELECT | 0 = WR CMD; 1 = RD CMD |
| 318 | 2 | 2 | PS[1] SELECT | 0 = PS[1] NOT SELECTED; 1 = PS[1] SELECTED |
| 320 | 2 | 1 | PS[1] RANK OR BL | VALUE INDICATES RANK OR BL SELECTION |
| 322 | 2 | 0 | PS[0] RANK OR BL | VALUE INDICATES RANK OR BL SELECTION |

FIG. 3A
(PRIOR ART)

TABLE 330 – "FORMAT 1"

| | TRANSFER | BCOM BIT | INDICATOR | VALUE |
|---|---|---|---|---|
| 332 | 1 | 2 | CMD SELECT | 0 = RD/WR; 1 = NON-DATA CMD |
| 334 | 1 | 1 | RESERVED | NOT USED |
| 336 | 1 | 0 | RD/WR SELECT | 0 = WR CMD; 1 = RD CMD |
| 338 | 2 | 2 | PS SELECT | 0 = PS[0] SELECTED; 1 = PS[1] SELECTED |
| 340 | 2 | 1 | BURST LENGTH | 0 = BC8; 1 = BL16 |
| 342 | 2 | 0 | RANK SELECT | 0 = RANK[0]; 1 = RANK[1] |

TABLE 350 – "FORMAT 2"

| | TRANSFER | BCOM BIT | INDICATOR | VALUE |
|---|---|---|---|---|
| 352 | 1 | 2 | CMD SELECT | 0 = RD/WR; 1 = NON-DATA CMD |
| 354 | 1 | 1 | DELAY[0] | VALUE OF DELAY BIT (TABLE 370) |
| 356 | 1 | 0 | RD/WR SELECT | 0 = WR CMD; 1 = RD CMD (REDUNDANT) |
| 358 | 2 | 2 | DELAY[1] | VALUE OF DELAY BIT (TABLE 370) |
| 360 | 2 | 1 | BURST LENGTH | 0 = BC8; 1 = BL16 |
| 362 | 2 | 0 | RANK SELECT | 0 = RANK[0]; 1 = RANK[1] |

TABLE 370 – DELAY OFFSET

| | | |
|---|---|---|
| 372 | 00 | NO DELAY |
| 374 | 01 | 1 CLK DELAY |
| 376 | 10 | 2 CLK DELAY |

FIG. 3B

TABLE 410 – "FORMAT 1"

| | TRANSFER | BCOM BIT | INDICATOR | VALUE |
|---|---|---|---|---|
| 412 | 1 | 2 | CMD SELECT | 0 = RD/WR; 1 = NON-DATA CMD |
| 414 | 1 | 1 | FORMAT | 0 = FORMAT 1 |
| 416 | 1 | 0 | RD/WR SELECT | 0 = WR CMD; 1 = RD CMD |
| 418 | 2 | 2 | PS SELECT | 0 = PS[0] SELECTED; 1 = PS[1] SELECTED |
| 420 | 2 | 1 | BURST LENGTH | 0 = BC8; 1 = BL16 |
| 422 | 2 | 0 | RANK SELECT | 0 = RANK[0]; 1 = RANK[1] |

TABLE 430 – "FORMAT 2"

| | TRANSFER | BCOM BIT | INDICATOR | VALUE |
|---|---|---|---|---|
| 432 | 1 | 2 | CMD SELECT | 0 = RD/WR; 1 = NON-DATA CMD |
| 434 | 1 | 1 | FORMAT | 1 = FORMAT 2 |
| 436 | 1 | 0 | RD/WR SELECT | 0 = WR CMD; 1 = RD CMD (REDUNDANT) |
| 438 | 2 | 2 | DELAY | 0 = 2 CLK DELAY; 1 = 1 CLK DELAY |
| 440 | 2 | 1 | BURST LENGTH | 0 = BC8; 1 = BL16 |
| 442 | 2 | 0 | RANK SELECT | 0 = RANK[0]; 1 = RANK[1] |

FIG. 4

BUFFER COMMUNICATION FOR DATA BUFFERS SUPPORTING MULTIPLE PSEUDO CHANNELS

FIELD

Descriptions are generally related to memory subsystems, and more particular descriptions are related to communication to memory module data buffers.

BACKGROUND

System memory in computer systems is often provided with a DIMM (dual inline memory module) that includes multiple DRAM (dynamic random access memory) devices. To reduce the loading on the system memory bus by the DRAM devices, LRDIMMs (load reduced DIMM) can be used, which includes an RCD (registered clock driver) and multiple data buffers. The RCD receives the commands and passes a subset of the commands to the data buffers to manage the data transmission between the DRAM devices and the host.

The RCD communications with the data buffers via a BCOM (buffer communication) bus, which can indicate the specific command (e.g., Read and Write commands). The BCOM commands are traditionally sent with very specific timing to control exactly when the data buffers transfer the data.

There are LRDIMM implementations that divide the devices on the DIMM into two pseudo channels that can transfer data simultaneously and improve data throughput. The data buffers for the pseudo channels time multiplex the data from both pseudo channels onto the host data bus. With two pseudo channels, the BCOM bus needs to provide twice as much information to the data buffers to manage two separate channels.

Traditional BCOM commands do not have enough bits to indicate all possible operating modes for two separate channels. Thus, prior implementations of pseudo channels have had to sacrifice either burst on the fly operation, the use of two ranks per pseudo channel, or non-target ODT. Changing the BCOM structure to include more bits would limit cross-compatibility of system designs, increasing complexity and cost.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

FIG. 3A is a table representation of a traditional BCOM command format.

FIG. 3B is a table representation of examples of a first BCOM command format and a second BCOM command format.

FIG. 4 is a table representation of examples of a first BCOM command format and a second BCOM command format.

Figure 1:
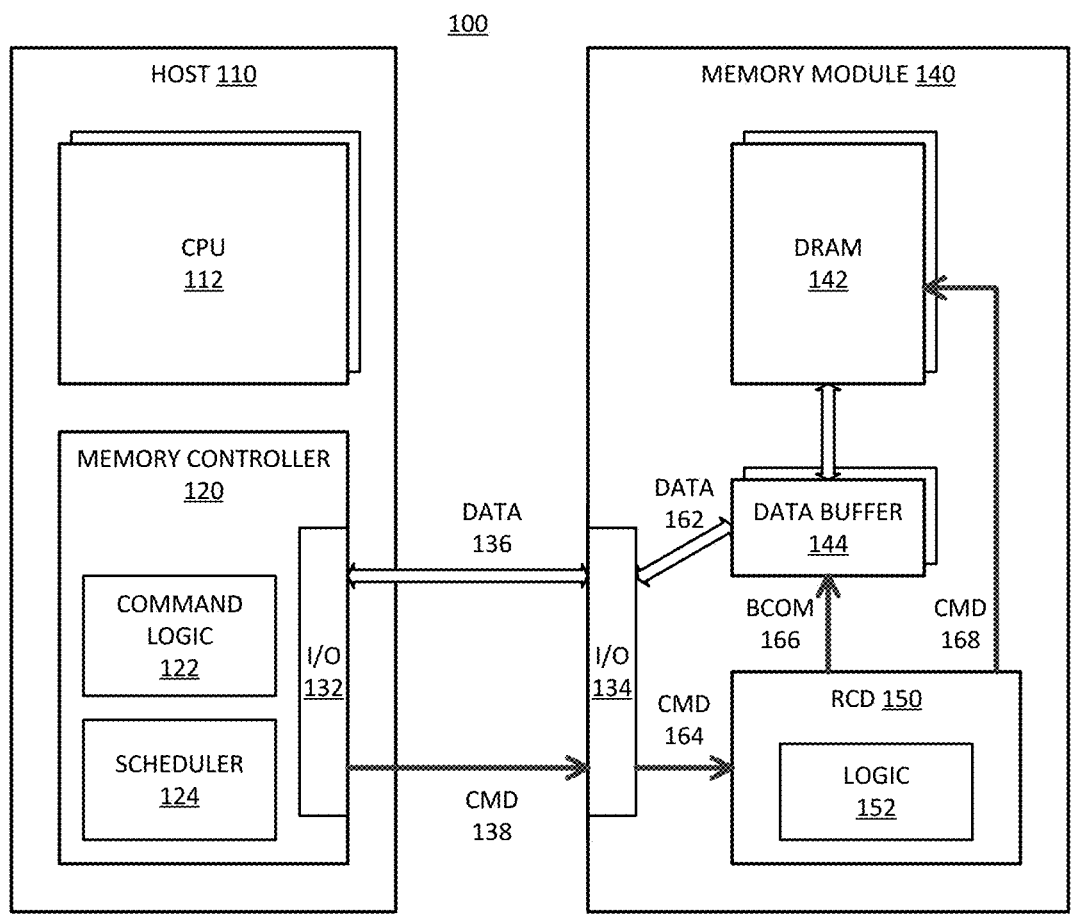
FIG. 1 is a block diagram of an example of a system with a memory module having a buffer communication bus.

Descriptions of certain details and implementations follow, including non-limiting descriptions of the figures, which may depict some or all examples, and well as other potential implementations.

DETAILED DESCRIPTION

As described herein, a memory module has data buffers coupled to a registered clock driver (RCD) via buffer communication (BCOM) bus. The memory module includes memory devices managed as a first pseudo channel and a second pseudo channel. The data buffers manage data transmission between the memory devices and a host based on commands received over the BCOM bus.

The BCOM commands can be separated for Read/Write transactions to serve both pseudo channels with one command. Thus, even though the commands provide information to multiple channels, the system can maintain the same number of signal lines on the BCOM bus and the same number of bits in the BCOM commands. The system can effectively provide more information with the same number of bits by applying a different protocol or interpretation of the bits in the BCOM commands. The different command layout or command protocol can leverage the fact that the timing of the commands provides information that can be inferred, and thus certain information does not need explicit bits to indicate as it can be inferred.

The use of a different protocol can increase the configurations that can be supported. The protocol can allow the BCOM commands to signal a read/write command for the same start time for separate pseudo channels. The RCD can send a first BCOM command on the BCOM bus to the data buffer, the first BCOM command to specify a rank and a burst length for the first pseudo channel. The RCD can send a second BCOM command on the BCOM bus to the data buffer, the second BCOM command to specify a rank and a burst length for the second pseudo channel, and a timing offset relative to the first BCOM command.

For purposes of description herein, reference is made to DRAM (dynamic random access memory) devices and DIMMs (dual inline memory modules). More specific examples are directed to load reduced (LRDIMMs). Reference to an LRDIMM or a memory module will be understood as referring to a module or unit that includes multiple DRAM devices accessed through one or more data buffers. The DRAM devices on the module can be managed as multiple pseudo channels, where the BCOM commands to the data buffer enable the data buffer to manage the access to the DRAM devices with desired timing and configurations. In addition to DIMMs, other types of memory module that allow for the parallel connection of memory devices can be used, such as a multichip package (MCP) with multiple memory devices in a stack.

In one specific example, the use of DRAM devices in an LRDIMM as multiple pseudo channels can be governed by a standard. An application of an LRDIMM with DDR5 (double data rate version 5, JESD79-5, originally published by JEDEC (Joint Electron Device Engineering Council) in July 2020)) DRAMs can be defined for an MCR (muxed combined ranks) configuration. In the MCR configuration, the DRAMs can be configured in ranks (e.g., devices on the front and devices on the back of the DIMM board), with multi-channel LRDIMMs (e.g., Channel 0 and Channel 1 or Channel A and Channel B), as well as being divided in pseudo channels (e.g., PS[0] (Pseudo channel 0) and PS[1] (Pseudo channel 1).

The host memory controller is aware of the configuration of memory as channels and ranks. The host memory controller is aware of the configuration of the memory as pseudo channels, and sends separate commands to the RCD for each pseudo channel. The commands are time multiplexed on the CA (command and address) bus from the host to the RCD. In one example, the host sends commands for PS[0] on even clocks and commands for PS[1] on odd clocks. The command rate on the CA bus from the host to the RCD can be double the rate of the RCD to the DRAMs to enable the host to send a command to each pseudo channel on every DRAM clock. The pseudo channels are described in more detail below.

FIG. 1 is a block diagram of an example of a system with a memory module having a buffer communication bus. System 100 illustrates memory coupled to a host. Host 110 represents a host computing system. Host 110 includes host hardware such as processor 112 and memory controller 120. The host hardware also includes hardware interconnects and driver/receiver hardware to provide the interconnection between host 110 and memory module 140. Memory module 140 represents a DIMM or LRDIMM or other multidevice package with memory devices coupled to host 110. Memory module 140 includes data buffers 144 to buffer data for data access to DRAMs 142. Memory controller 120 controls access from the host side to DRAMs 142 of memory module 140. RCD 150 can control access to DRAMs 142 on memory module 140.

The host hardware supports the execution of host software on host 110. The host software can include host OS (operating system). The host OS represents a software platform under which other software will execute. During execution, software programs, including the host OS, generate requests to access memory. The requests can be directly from host OS software, from other software programs, from requests through APIs (application programming interfaces), or other mechanisms. In response to a host memory access request, memory controller 120 can generate a memory access request for memory module 140.

In one example, memory controller 120 includes command logic 122, which represents logic in memory controller 120 to generate commands to send to the memory devices of memory module 140. The commands can include Read commands for Read transactions and Write commands for Write transactions. Memory controller 120 includes scheduler 124 to schedule how commands will be sent to the memory devices of memory module 140, including controlling the timing of the commands.

Memory controller 120 includes I/O (input/output) 132, which represents interface hardware to interconnect host 110 with memory. I/O 134 represents interface hardware on memory module 140 to interconnect with host 110. I/O 132 and I/O 134 can have one or more system buses to interconnect them. System 100 represents data 136 and command (CMD) 138 between I/O 132 and I/O 134. Data 136 represents a data bus, which is typically a bidirectional point to point bus, where the collection of the signal lines to the individual data buffer 144 is collectively referred to as the data bus. Command 138 represents a command bus or command and address (CA) bus, which is typically a unidirectional multidrop bus from the host to the memory.

Memory module 140 includes multiple DRAMs 142, which represent memory devices. Memory module 140 includes data buffers 144, which buffer data 136 between DRAMs 142 and host 110. Data 162 represents the data bus signal lines on memory module 140 from I/O 134 to data buffers 144 and from the data buffers to DRAMs 142. Command (CMD) 164 represents the signal lines on memory module 140 from I/O 134 to RCD 150. Command (CMD) 168 represents signal lines on memory module 140 from RCD 150 to DRAMs 142 to provide command and device selection (e.g., chip select (CS)) signals. BCOM (buffer communication) 166 represents signal lines from RCD 150 to data buffers 144 to control the operation of the data buffers for memory access commands involving the exchange of data (i.e., read and write commands).

RCD 150 receives commands from host 110 and generates commands on memory module 140 to memory devices to which the host commands are directed. Logic 152 can represent control logic within RCD 150 to control the retiming of command signals. Logic 152 can represent control logic within RCD 150 to control the operation of data buffers 144. More specifically, logic 152 can generate BCOM commands to control the operation and the timing of data buffers 144.

In one example, logic 152 includes firmware or software logic. In one example, logic 152 includes hardware logic. In one example, logic 152 includes a combination of hardware and software/firmware logic.

In contrast to a traditional BCOM implementation that has limitations on the features and configurations that can be supported by the application of pseudo channels on memory module 140, RCD 150, through logic 152, can generate BCOM commands that can remove at least some of the traditional limitations. In one example, memory module 140 can support the use of pseudo channels with burst on the fly and multiple ranks per pseudo-channel. In one example, memory module 140 can support the use of pseudo-channels with non-target ODT (on die termination) control.

BCOM 166 can be referred to as a BCOM bus. The BCOM commands can direct data buffers 144 to control the transfer of data from a first pseudo channel and a second pseudo channel implemented on memory module 140. In one example, the format and the interpretation of the BCOM command can be different depending on the timing between BCOM commands on the BCOM bus. In one example, RCD 150 sends a first BCOM command to control the data transfer for the first pseudo channel. The first BCOM command can specify a rank and a burst length for the first pseudo channel. RCD 150 can send a second BCOM command to control the data transfer for the second pseudo channel. The second BCOM command can have different formats depending on its timing relative to the first BCOM command. In one example, the format of the second BCOM command is the same as the format of the first BCOM command. In one example, the second BCOM command has a different format, which specifies a rank and a burst length for the second pseudo channel, and a timing offset relative to the first BCOM command.

In some implementations, the data buffers (e.g., data buffers 144) can make inferences about received BCOM commands that are received within certain timing. In one example, consecutive BCOM commands made to the same pseudo channel must be separated by a delay period (e.g., 8 clocks). Thus, for any second BCOM command sent by the RCD within the delay period of a first BCOM command, the data buffer(s) can infer that the second BCOM command is directed to the same command type and that it is directed to the other pseudo channel.

The data buffer cannot receive data on the data bus for a write at the same time as sending data on the data bus for a read, thus, a second BCOM command received before the prior data access transaction is completed must be for the same direction of data transfer, and thus, the command must be the same command type (if both are directed to commands that transfer data). Thus, when the first BCOM command specifies a read command, the data buffer can infer the second BCOM command is directed to a read command. Similarly, when the first BCOM command specifies a write command, and the data buffer can infer the second BCOM command is directed to a write command.

Additionally, if there is a requirement for a delay period between intra-pseudo-channel commands, a BCOM command received within the delay period must be for the other pseudo channel. Thus, the second format can leverage the inferences that the data buffer can make, and does not need to include certain information that can be understood by inference. In one example, the system always uses the first format unless the second command is exactly consecutive to the first command. In one example, the system always uses the second format when the second command is directly consecutive to the first command, and only uses the second format when the second command is directly consecutive to the first command, as described below in reference to FIG. 3B. In one example, the system always uses the first format unless the second command is exactly consecutive to the first command, but then the system can select to use either the first format or the second format for the second command, depending on the delay to be indicated, as described below in reference to FIG. 4.

Figure 2A:
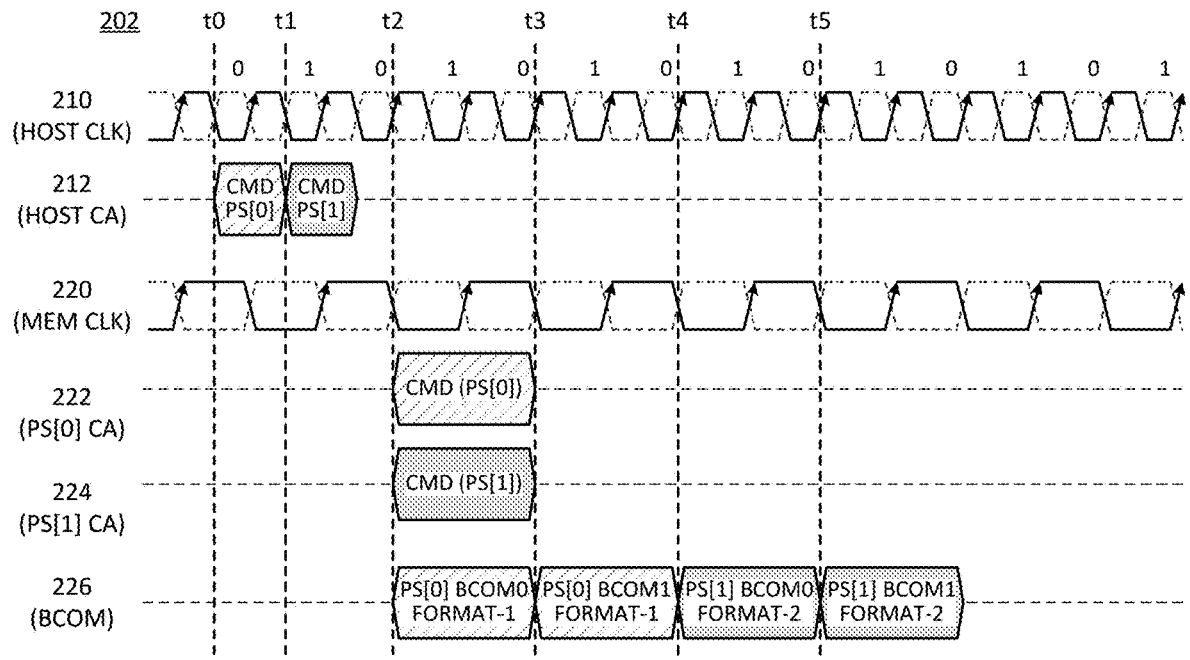
FIGS. 2A-2D are examples of BCOM timing for a system with pseudo channels.

FIG. 2A is an example of BCOM timing for a system with pseudo channels. Diagram 202 represents a timing diagram of the timings for BCOM commands, such as BCOM commands sent by RCD 150 on BCOM bus 166 to data buffers 144. More specifically, diagram 202 represents the timing for signals when the access command for the two pseudo channels is for the same clock.

Signal 210 represents a host clock (HOST CLK) signal on one or more signal lines, which represents the clock signal that controls the timing of command signals from the host to the RCD. System 100 does not specifically represent a clock signal, but the clock signal can accompany the command bus to indicate the command timing. Commands are represented as two clocks. The zeros and ones represent the fixed slots for each pseudo channel on the host bus.

Signal 212 represents a host command (HOST CA) signal on one or more signal lines. The two commands represented on signal 212 are labeled as CMD PS[0] for an access command to the first pseudo channel, which can be either a read command or a write command, and CMD PS[1] for an access command to the second pseudo channel, which will be the same type of access command as CMD PS[0]. Signal 212 is sent by the host or the host memory controller to the RCD (e.g., from memory controller 120 of host 110 to RCD 150, over CMD 138).

Signal 220 represents a memory clock (MEM CLK) signal on one or more signal lines, which represents the clock signal that controls the timing of BCOM command signals from the RCD to the memory devices or DRAMs (e.g., from RCD 150 to DRAMs 142).

Signal 222 represents a command (CA) signal on one or more signal lines for a first pseudo (PS) channel, identified as PS[0]. Thus, signal 222 can represent the PS[0] CA signal, or the command signal sent by the RCD to the memory devices of the first pseudo channel. For example, RCD 150 could indicate CMD PS[0] of signal line 212 over CMD 168 to the DRAMs of the first pseudo channel.

Signal 224 represents a command (CA) signal on one or more signal lines for a second pseudo (PS) channel, identified as PS[1]. Thus, signal 224 can represent the PS[1] CA signal, or the command signal sent by the RCD to the memory devices of the second pseudo channel. As with the first pseudo channel command, RCD 150 could indicate CMD PS[1] of signal line 212 over CMD 168 to the DRAMs of the second pseudo channel.

Signal 226 represents a BCOM command on one or more signal lines from the RCD to the data buffer or data buffers. For example, signal 226 can represent BCOM commands from RCD 150 to data buffers 144 over BCOM 166. Consider the following examples in diagram 202 based on the specific times indicated in the diagram.

At time t0, the host sends CMD PS[0] (e.g., a Read or a Write) on signal 212, which triggers access to DRAMs in PS[0]. At time t1, the host sends CMD PS[1] on signal 212, which triggers access to DRAMs in PS[1]. At time t2, the RCD generates the command on signal 222 to PS[0] with CMD PS[0] and on signal 224 to PS[1] with CMD PS[1]. It will be observed that diagram 202 represents the commands as taking two clocks or two clock cycles on the memory module from the RCD based on signal 220, whereas the command on the host bus to the RCD is only one clock relative to signal 220, two clock cycles for signal 210. In one example, the use of two pseudo channels can allow the memory module to use a slower communication speed (e.g., half) as compared to the host bus. Thus, the commands on signal 222 and signal 224 can represent the same command as the command on signal 212, but transmitted at half the speed. For identification, the command to PS[0] is illustrated with cross-hatch and the command to PS[1] is illustrated with shading.

In one example, at time t2, or approximately at the same time as t2, the RCD generates a BCOM command on signal 226 to the data buffer(s) that buffer the memory devices selected by the access command. In one example, there is a time delay, such as a one clock cycle delay or a two clock cycle delay, between the commands on the pseudo channel CA buses and the BCOM command. Thus, the signals on signal 226 can start at one or more clock cycles after time t2. In one example, the RCD determines which of the pseudo channels to signal first. The determination of which pseudo channel to signal first can be a matter of configuration, such as always signaling PS[0] first, and then signaling PS[1] (or the reverse). For purposes of diagram 202, the RCD generates the BCOM command for PS[0], and then generates the BCOM command for PS[1].

In one example, at time t2, the RCD sends PS[0] BCOM0, which is the first BCOM transfer for pseudo channel PS[0]. The BCOM commands (as illustrated below) are two clock commands, with a first transfer on one clock and the second transfer on the next clock, as indicated on signal 226. In one example, PS[0] BCOM0 is of Format-1. The RCD sends the second part of the first BCOM transfer at time t3, represented as PS[0] BCOM1, which is the second transfer of the Format-1 signal.

At time t4, the RCD sends the second BCOM command to PS[1] on signal 226. The second BCOM command is also a two cycle command, with the RCD sending the PS[1] BCOM0 as the first part of the command, and sending PS[1] BCOM1 as the second part of the PS[1] command at time t5. Time t4, when the RCD sends the second BCOM command, is exactly two clock cycles after the BCOM command to PS[0]. It will be understood that the command delay refers to the beginning of the first BCOM command to the beginning of the second BCOM command. Measurement by other references would result in different timing.

While the timing is illustrated and described as being "exactly two clock cycles", it will be understood that the meaning of the timing is that the second BCOM command is sent directly after the first BCOM command, with no intervening clock cycles or timing between the BCOM commands. Thus, for a system that uses a different BCOM timing, such as one cycle commands or three cycle commands, the timing would be, respectively, one clock cycle or three clock cycles, or whatever timing would cause the second BCOM command to be sent directly after the first BCOM command without delay between the commands.

The timing of the consecutive commands can be referred to as having a separation of the number of clock cycles between the start of the first command and the start of the second command. The commands can be said to be separated by the number of clock cycles between the start of the sending the two commands. When the second command starts on the next clock cycles after the first command ends, the two command can be said to be directly consecutive.

In one example, when the RCD sends two BCOM commands consecutively without intervening delay, the format of the first BCOM command is the first format (Format-1) and the format of the second BCOM command is a second format (Format-2), as indicated with PS[0] BCOM0 and PS[0] BCOM1 being Format-1 and PS[1] BCOM0 and PS[1] BCOM1 being Format-2. Examples of differences in format are provided below. In general, the difference in the second format relative to the first format is that the second format indicates a timing offset relative to the first BCOM command. Thus, the second BCOM command (Format-2) can indicate if the BCOM command has the correct timing, whether it is supposed to align in timing with the first BCOM command (i.e., both PS[0] and PS[1] will transfer data on the same clock cycle), or whether it is supposed to be one clock cycle offset from the first BCOM command (i.e., PS[1] is supposed to start data transfer one clock cycle after PS[0] starts).

In diagram 202, the Format-2 BCOM command to PS[1] will indicate that the PS[1] command has the same timing as the command for PS[0], and thus, the data for the two will be on the same clock. In one example, the Format-2 BCOM command to PS[1] will indicate a −2 clock delay, since the DRAM command (at time t2) was sent 2 clocks before the BCOM command (at time t4).

Figure 2B:
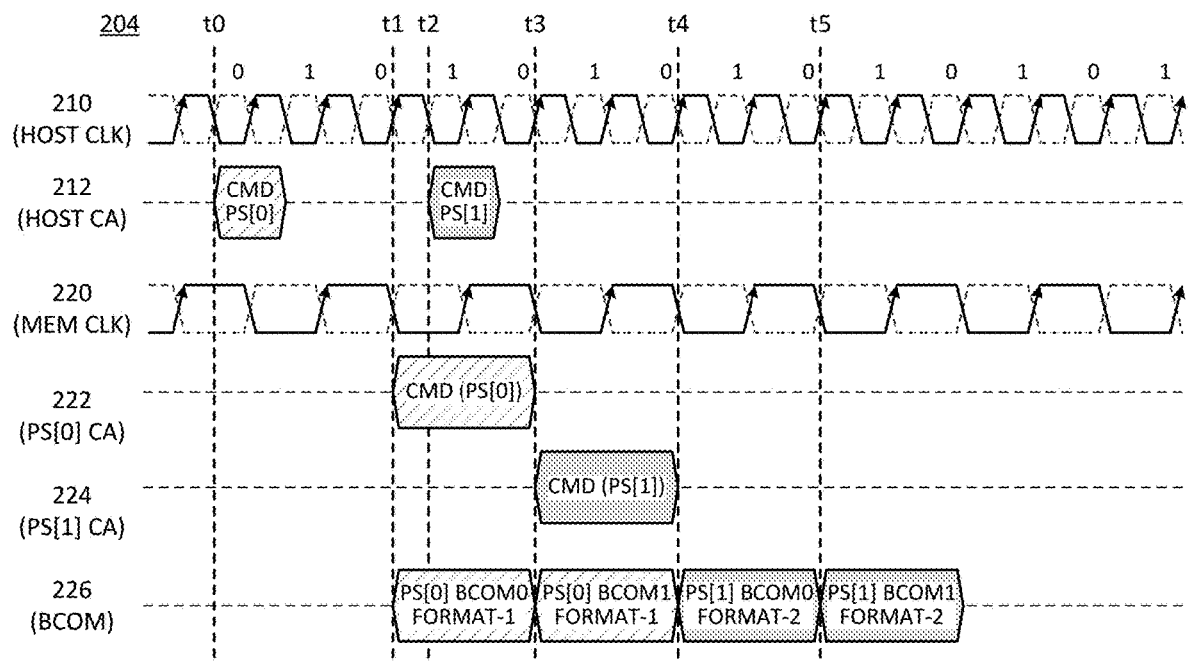

FIG. 2B is an example of BCOM timing for a system with pseudo channels. Diagram 204 represents a timing diagram of the timings for BCOM commands when the access command the second pseudo channel is one clock after the command for the first pseudo channel.

Similar to diagram 202, diagram 204 illustrates host clock (HOST CLK) signal 210, host command (HOST CA) signal 212, memory clock (MEM CLK) signal 220, PS[0] command (PS[0] CA) signal 222, PS[1] command (PS[1] CA) signal 224, and BCOM command signal 226. These signals can be the same signal lines. The timings illustrated also begin with time t0, which is understood as an initial time for the signaling scenario where the second pseudo channel command comes one clock after the first pseudo channel command. The timing indicators in diagram 204 are not to be understood the same as the timing indicators for diagram 202.

At time t0, the host sends CMD PS[0] (e.g., a Read or a Write) on signal 212, which triggers access to DRAMs in PS[0]. The host does not send the CMD PS[1] on the next time slot for the PS[1] pseudo channel (i.e., the '1' above signal 210 directly after CMD PS[0]). Thus, the next time to send the command for PS[1] is at the next time slot for PS[1], or one clock cycle later, at time t2.

At time t1, before the host sends the CMD PS[1] command on signal 212, the RCD generates the command on signal 222 to PS[0] with CMD PS[0]. In one example, at, or approximately at, the same time as t1, the RCD generates the first transfer of the BCOM command for PS[0] on signal 226, indicated as PS[0] BCOM0, which is a Format-1 command.

At time t3, in response to CMD PS[1] on signal 212 at time t2, the RCD sends CMD PS[1] for the second pseudo channel on signal 224. Time t3 is a clock cycle after the RCD sent CMD PS[0] on signal 222. Also at time t3, the RCD sends the second transfer of the BCOM command to PS[0] on signal 226, indicated as PS[0] BCOM1, which is the second transfer of the Format-1 command.

At time t4, the RCD sends the first transfer of the BCOM command to PS[1] on signal 226, indicated as PS[1] BCOM0, which is the first transfer of the command. In one example, because the RCD sends PS[1] BCOM0 two clocks after PS[0] BCOM 0, the PS[1] BCOM command is a Format-2 command. At time t5, the RCD the second transfer of the BCOM command to PS[1] on signal 226, indicated as PS[1] BCOM1, which is the second transfer of the Format-2 command. In one example, the PS[1] BCOM command (at time t4 and time t5) will indicate a delay of −1 to indicate that the DRAM command was send 1 clock before the BCOM command.

Figure 2C:
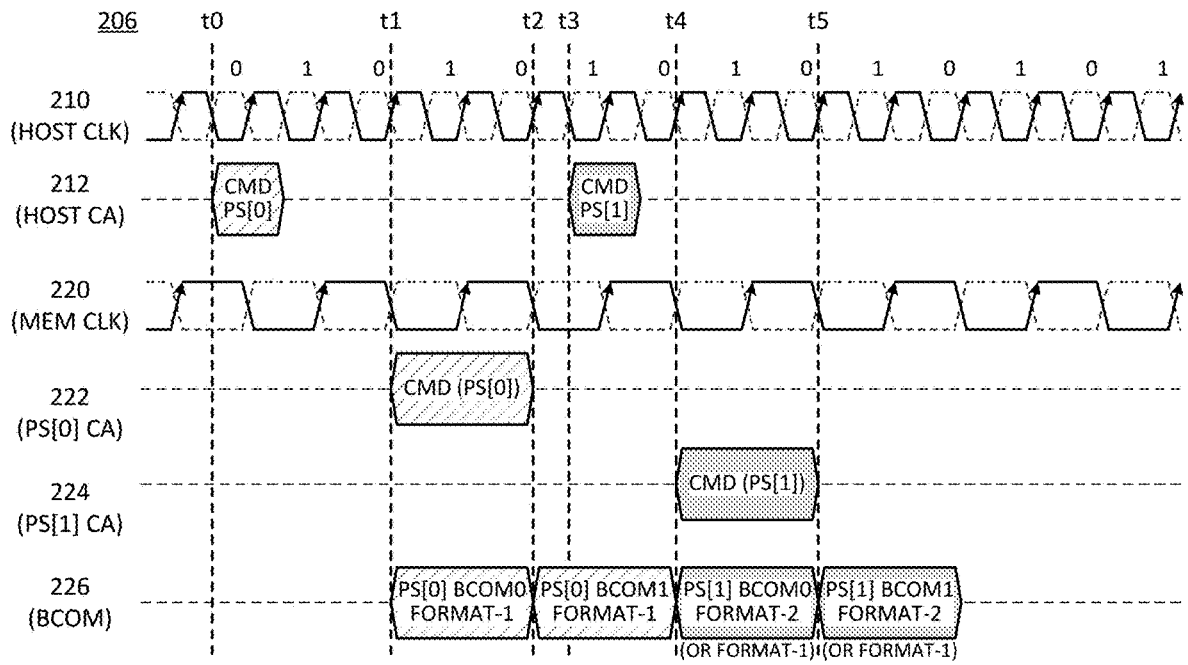

FIG. 2C is an example of BCOM timing for a system with pseudo channels. Diagram 206 represents a timing diagram of the timings for BCOM commands when the access command the second pseudo channel is two clocks after the command for the first pseudo channel.

Similar to diagram 202, diagram 206 illustrates host clock (HOST CLK) signal 210, host command (HOST CA) signal 212, memory clock (MEM CLK) signal 220, PS[0] command (PS[0] CA) signal 222, PS[1] command (PS[1] CA) signal 224, and BCOM command signal 226. These signals can be the same signal lines. The timings illustrated also begin with time t0, which is understood as an initial time for the signaling scenario where the second pseudo channel command comes one clock after the first pseudo channel command. The timing indicators in diagram 206 are not to be understood the same as the timing indicators for diagram 202.

At time t0, the host sends CMD PS[0] (e.g., a Read or a Write) on signal 212, which triggers access to DRAMs in PS[0]. The host sends the CMD PS[1] two clocks later, thus, not on the next time slot for the PS[1] pseudo channel (i.e., the '1' above signal 210 directly after CMD PS[0]), but two time slots later. Thus, the host sends CMD PS[1] on signal 212 at time t3.

At time t1, before the host sends the CMD PS[1] command on signal 212, the RCD generates the command on signal 222 to PS[0] with CMD PS[0]. In one example, at, or approximately at, the same time as t1, the RCD generates the first transfer of the BCOM command for PS[0] on signal 226, indicated as PS[0] BCOM0, which is a Format-1 command. At time t2, the RCD sends the second transfer of the BCOM command to PS[0] on signal 226, indicated as PS[0] BCOM1, which is the second transfer of the Format-1 command.

At time t4, in response to CMD PS[1] on signal 212 at time t3, the RCD sends CMD PS[1] for the second pseudo channel on signal 224. Time t4 is two clock cycles after the RCD sent CMD PS[0] on signal 222.

At time t4, the RCD sends the first transfer of the BCOM command to PS[1] on signal 226, indicated as PS[1] BCOM0, which is the first transfer of the command. In one example, because the RCD sends PS[1] BCOM0 two clocks after PS[0] BCOM 0, the PS[1] BCOM command is a Format-2 command. At time t5, the RCD the second transfer of the BCOM command to PS[1] on signal 226, indicated as PS[1] BCOM1, which is the second transfer of the Format-2 command.

In one example, the PS[1] BCOM command (at time t4 and time t5) will indicate a delay of 0 to indicate that the DRAM command was send 0 clocks before the BCOM command. In one example, where the BCOM command format includes a field to indicate the format of the BCOM command, the RCD would send the PS[1] BCOM command as a Format-1 command instead of a Format-2 command.

Figure 2D:
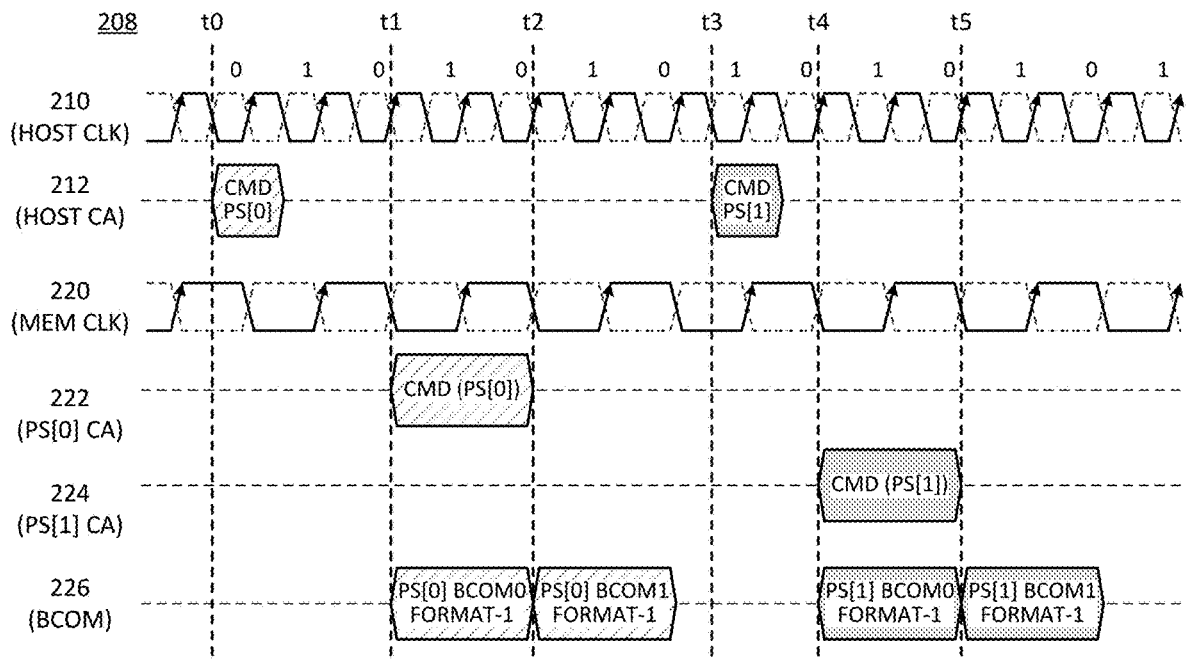

FIG. 2D is an example of BCOM timing for a system with pseudo channels. Diagram 208 represents a timing diagram of the timings for BCOM commands when the access command the second pseudo channel is three clocks after the command for the first pseudo channel. The representation of three clocks later would be the same for more than three clocks later.

Similar to diagram 202, diagram 208 illustrates host clock (HOST CLK) signal 210, host command (HOST CA) signal 212, memory clock (MEM CLK) signal 220, PS[0] command (PS[0] CA) signal 222, PS[1] command (PS[1] CA) signal 224, and BCOM command signal 226. These signals can be the same signal lines. The timings illustrated also begin with time t0, which is understood as an initial time for the signaling scenario where the second pseudo channel command comes one clock after the first pseudo channel command. The timing indicators in diagram 208 are not to be understood the same as the timing indicators for diagram 202.

At time t0, the host sends CMD PS[0] (e.g., a Read or a Write) on signal 212, which triggers access to DRAMs in PS[0]. The host sends the CMD PS[1] three clocks later, thus, not on the next time slot for the PS[1] pseudo channel (i.e., the '1' above signal 210 directly after CMD PS[0]), but three time slots later. Thus, the host sends CMD PS[1] on signal 212 at time t3.

At time t1, the RCD generates the command on signal 222 to PS[0] with CMD PS[0]. In one example, at, or approximately at, the same time as t1, the RCD generates the first transfer of the BCOM command for PS[0] on signal 226, indicated as PS[0] BCOM0, which is a Format-1 command. At time t2, the RCD sends the second transfer of the BCOM command to PS[0] on signal 226, indicated as PS[0] BCOM1, which is the second transfer of the Format-1 command.

At time t4, in response to CMD PS[1] on signal 212 at time t3, the RCD sends CMD PS[1] for the second pseudo channel on signal 224. At, or approximately at, time t4, the RCD sends the first transfer of the BCOM command to PS[1] on signal 226, indicated as PS[1] BCOM0, which is the first transfer of the command. In one example, because the RCD sends PS[1] BCOM0 more than two clocks after PS[0] BCOM 0, the PS[1] BCOM command is a Format-1 command. At time t5, the RCD the second transfer of the BCOM command to PS[1] on signal 226, indicated as PS[1] BCOM1, which is the second transfer of the Format-1 command. The timing of the PS[1] BCOM command is correct, and no delay indication is needed. Thus, the RCD can send a Format-1 command.

FIG. 3A is a table representation of a traditional BCOM command format. Table 310 represents a format or protocol/bit indication of a traditional BCOM command for a system that provides two pseudo channels, PS[0] and PS[1]. There can be other bits of the command, which are not illustrated in table 310. The BCOM command is assumed to be two clock cycles, with transfer 1 indicating the transfer on the first clock cycle and transfer 2 indicating the transfer on the second clock cycle.

Row 312, row 314, and row 316 represent BCOM bits [2:0], respectively, of the first clock of the BCOM command. Row 312 indicates a command (CMD) select bit, where a logic '0' indicates a read or a write command (i.e., a command for which the data buffer will transfer data) and a logic '1' indicates a non-data command. Row 314 indicates a PS[0] select bit, where a logic '0' indicates PS[0] is not selected and a logic '1' indicates PS[0] is selected. Row 316 indicates a selection between type of data command, where a logic '0' indicates a write command and a logic '1' indicates a read command.

Row 318, row 320, and row 322 represent BCOM bits [2:0], respectively, of the second clock of the BCOM command. Row 318 indicates a PS[1] select bit, where a logic '0' indicates PS[1] is not selected and a logic '1' indicates PS[1] is selected. Row 320 indicates selection of a rank or a burst length (BL) for PS[1]. Row 322 indicates selection of a rank or a burst length (BL) for PS[0].

It will be observed from row 320 and row 322 that the traditional BCOM command cannot indicate a rank and a burst length for a pseudo channel. Rather, the system would be configured which feature to use, and then that feature can be enabled or disable with these bits. For row 320 and row 322, the value of the bit indicates a rank selection if rank is configured for use, or a burst length selection if burst length is configured for use. For example, rank can be indicated for a DIMM with ×8 DRAMs, and burst length can be indicated for ×4 DRAMs.

FIG. 3B is a table representation of examples of a first BCOM command format and a second BCOM command format. In contrast to table 310, a system can apply a different format for the BCOM command enabling the BCOM command to indicate a rank and a burst length for a pseudo channel. The BCOM command format can be separated into two formats, depending on the timing of the second command relative to the first command.

In contrast to the traditional BCOM command, which can select both PS[0] and PS[1] by the same command, with the new format, the RCD will send separate commands for the different pseudo channels. The new BCOM commands can provide for both the rank and burst length. In one example, the RCD normally uses Format 1 (table 330), with Format 2 (Table 350) reserved for the case when the RCD will send commands to PS[0] and PS[1] directly consecutive to each other (e.g., two clock cycles apart).

If a BCOM command is limited to one pseudo channel, the timing of the BCOM command for the second pseudo channel would be delayed by at least 2 clocks relative to the first pseudo channel indicated, which would provide an unacceptable limitation on the system. The use of two formats for the BCOM command can address the timing limitation, by having the second command indicate a timing offset relative to the first command, allowing the system to trigger the timing of the second command to be the same as the first command, or offset by one clock.

When the RCD sends a Read/Write BCOM command exactly two clocks after the previous Read/Write BCOM command, the data buffer can infer two things. The first is that the command must be the same command for the data transfer to occur in the same direction as the previous command. Additionally, since the timing offset for commands to the same pseudo channel has not been met, the data buffer can infer the second BCOM command is indicated for the OTHER pseudo channel; thus, whatever pseudo channel the first BCOM command indicates, the second BCOM command must indicate a command for the other pseudo channel.

In one example, to indicate the command timing offset, the second BCOM command format indicates timing offset information. In one example, the timing offset can enable the RCD to indicate that the second BCOM command is intended to have the same start time, a one clock delay relative to, or a two clock delay relative to, the previous command or the first BCOM command. With the same start time, both pseudo channels are to start at the same time. With a one clock delay, the pseudo channel indicated by or inferred from the second BCOM command is to start one clock after the pseudo channel indicated by the first BCOM command. With a two clock delay, the pseudo channel indicated by or inferred from the second BCOM command is to start two clocks after the pseudo channel indicated by the first BCOM command.

Table 330 represents a format or protocol/bit indication of a new BCOM command for a system that provides two pseudo channels, PS[0] and PS[1]. There can be other bits of the command, which are not illustrated in Table 330. Other bits of the command not shown would not be changed from a traditional protocol. The BCOM command is assumed to be two clock cycles, with transfer 1 indicating the transfer on the first clock cycle and transfer 2 indicating the transfer on the second clock cycle. In one example, Table 330 represents a first format to use as a default BCOM command.

Row 332, row 334, and row 336 represent BCOM bits [2:0], respectively, of the first clock of the first format BCOM command. Row 332 indicates a command (CMD) select bit, where a logic '0' indicates a read or a write command (i.e., a command for which the data buffer will transfer data) and a logic '1' indicates a non-data command. Row 334 is a reserved bit, not used in Format 1. Row 336 indicates a selection between type of data command, where a logic '0' indicates a write command and a logic '1' indicates a read command.

Row 338, row 340, and row 342 represent BCOM bits [2:0], respectively, of the second clock of the first format BCOM command. Row 338 indicates a pseudo channel select bit, where a logic '0' indicates PS[0] is selected and a logic '1' indicates PS[1] is selected. Row 340 indicates a burst length (BL) selection for the pseudo channel indicated in row 338, where a logic '0' indicates BC8 (burst chop 8, or burst chop for only 8 transfer cycles) and a logic '1' indicates BL16 (full burst of 16 transfer cycles). Row 342 indicates a rank selection for the pseudo channel indicated in row 338, where a logic '0' indicates Rank[0] and a logic '1' indicates Rank[1].

Table 350 represents a second format to use as a BCOM command when the BCOM command will be sent directly consecutive to a first BCOM command. The command illustrated is also assumed to be two clock cycles, with transfer 1 indicating the transfer on the first clock cycle and transfer 2 indicating the transfer on the second clock cycle.

Row 352, row 354, and row 356 represent BCOM bits [2:0], respectively, of the first clock of the second format BCOM command. Row 352 indicates a command (CMD) select bit, where a logic '0' indicates a read or a write command (i.e., a command for which the data buffer will transfer data) and a logic '1' indicates a non-data command. Row 354 indicates a first delay bit (Delay[0]), where the value of the bit is the LSB (least significant bit) as a lookup table reference for Table 370. Row 356 indicates a selection between type of data command, where a logic '0' indicates a write command and a logic '1' indicates a read command. It will be understood that row 356 is redundant information, since the type of command can be inferred based on the type of command indicated in Table 330.

Row 358, row 360, and row 362 represent BCOM bits [2:0], respectively, of the second clock of the second format BCOM command. Row 358 indicates a first delay bit (Delay[1]), where the value of the bit is the MSB (most significant bit) as a lookup table reference for Table 370. Row 360 indicates a burst length (BL) selection, where a logic '0' indicates BC8 (burst chop 8, or burst chop for only 8 transfer cycles) and a logic '1' indicates BL16 (full burst of 16 transfer cycles). Row 362 indicates a rank selection, where a logic '0' indicates Rank[0] and a logic '1' indicates Rank[1]. The pseudo channel to which row 360 and row 362 apply will be the "other" pseudo channel as the one indicated in row 338 of Table 330. The pseudo channel for the Format 2 command is inferred as the other pseudo channel to what is specified in the Format 1 command.

The delay indicated by Delay[1:0] (row 354 and row 358) represents two bits interpreted as in Table 370 to indicate the delay offset relative to the timing of the Format 1 command sent just prior to the Format 2 command. Thus, Table 370 can indicate a two bits of delay code. In one example, the encoding of the delay bits can be as indicated in row 372 ('00'), row 374 ('01'), and row 376 ('10'). As indicated, a '00'=no delay, indicating the command has the proper timing for the data (e.g., 2 clocks after the previous command); a '01'=1 clock delay, indicating the data for the command will come on the data bus one clock earlier than the command timing; a '10'=2 clock delay, indicating the data for the command will come on the data bus two clocks earlier than the command timing (e.g., at the same time as the other pseudo channel); and, a '11' is not defined for Table 370, but could be used to indicate a different delay offset. It will be understood that the timing offset is relative to the prior (Format 1) command. Thus, if the command would normally have a timing of N clock cycles from receipt of the BCOM command to the receipt of the data on the data bus, and the offset will indicate (N), (N−1), or (N−2) in accordance with Table 370. Other offsets could alternatively be used.

The RCD determines how to send the BCOM commands. In example, if both channels have the same data timing, the RCD can set the cycle and burst length of the first pseudo channel with the Format 1 command. In one example, the RCD can send the Format 2 BCOM command two cycles after the first BCOM command to set the configuration for the second pseudo channel with the appropriate timing offset indicated.

FIG. 4 is a table representation of examples of a first BCOM command format and a second BCOM command format. Table 410 and Table 430 represent a first format and second format BCOM command approach to contrast with the traditional BCOM command illustrated in Table 410. Table 410 represents a Format 1 BCOM command as an alternative to the Format 1 BCOM command indicated in Table 430. Table 430 represents a Format 2 BCOM command as a companion or corresponding command to the Format 1 BCOM command of Table 410, and is an alternative to the Format 2 BCOM command of Table 430.

The timing and use of the first format and the second format is the same as indicated previously, with a different protocol. Table 410 represents a format or protocol/bit indication of a new BCOM command for a system that provides two pseudo channels, PS[0] and PS[1]. There can be other bits of the command, which are not illustrated in table 410. Other bits of the command not shown would not be changed from a traditional protocol. The BCOM command is assumed to be two clock cycles, with transfer 1 indicating the transfer on the first clock cycle and transfer 2 indicating the transfer on the second clock cycle. In one example, Table 410 represents a first format to use as a default BCOM command.

Row 412, row 414, and row 416 represent BCOM bits [2:0], respectively, of the first clock of the first format BCOM command. Row 412 indicates a command (CMD) select bit, where a logic '0' indicates a read or a write command (i.e., a command for which the data buffer will transfer data) and a logic '1' indicates a non-data command. Row 414 indicates a format select bit, where a logic '0' indicates the command is a Format 1 command. Row 416 indicates a selection between type of data command, where a logic '0' indicates a write command and a logic '1' indicates a read command.

Row 418, row 420, and row 422 represent BCOM bits [2:0], respectively, of the second clock of the first format BCOM command. Row 418 indicates a pseudo channel select bit, where a logic '0' indicates PS[0] is selected and a logic '1' indicates PS[1] is selected. Row 420 indicates a burst length (BL) selection for the pseudo channel indicated in row 418, where a logic '0' indicates BC8 (burst chop 8, or burst chop for only 8 transfer cycles) and a logic '1' indicates BL16 (full burst of 16 transfer cycles). Row 422 indicates a rank selection for the pseudo channel indicated in row 418, where a logic '0' indicates Rank[0] and a logic '1' indicates Rank[1].

Table 430 represents a second format to use as a BCOM command when the BCOM command will be sent directly consecutive to the first BCOM command of Table 410. The command illustrated is also assumed to be two clock cycles, with transfer 1 indicating the transfer on the first clock cycle and transfer 2 indicating the transfer on the second clock cycle.

Row 432, row 434, and row 436 represent BCOM bits [2:0], respectively, of the first clock of the second format BCOM command. Row 432 indicates a command (CMD) select bit, where a logic '0' indicates a read or a write command (i.e., a command for which the data buffer will transfer data) and a logic '1' indicates a non-data command. Row 434 indicates a format select bit, where a logic '1' indicates the command is a Format 2 command. Row 436 indicates a selection between type of data command, where a logic '0' indicates a write command and a logic '1' indicates a read command. It will be understood that row 436 is redundant information, since the type of command can be inferred based on the type of command indicated in Table 410.

Row 438, row 440, and row 442 represent BCOM bits [2:0], respectively, of the second clock of the second format BCOM command. Row 438 indicates a delay bit, where a logic '0' indicate a 2 clock delay and a logic '1' indicates a 1 clock delay. In one example, to achieve a zero clock delay, the RCD can send a Format 1 BCOM command again. More detail on this implementation follows below.

Row 440 indicates a burst length (BL) selection, where a logic '0' indicates BC8 (burst chop 8, or burst chop for only 8 transfer cycles) and a logic '1' indicates BL16 (full burst of 16 transfer cycles). Row 442 indicates a rank selection, where a logic '0' indicates Rank[0] and a logic '1' indicates Rank[1]. The pseudo channel to which row 440 and row 442 apply will be the "other" pseudo channel as the one indicated in row 418 of Table 410. The pseudo channel for the Format 2 command is inferred as the other pseudo channel to what is specified in the Format 1 command.

The RCD determines how to send the BCOM commands. In example, if both channels have the same data timing, the RCD can set the cycle and burst length of the first pseudo channel with the Format 1 command. In one example, the RCD can send the Format 2 BCOM command two cycles after the first BCOM command to set the configuration for the second pseudo channel with the appropriate timing offset indicated.

The application of Format 1 in accordance with Table 410 and Format 2 in accordance with Table 430 can eliminate the need for the data buffer to remember state, if there is a rule associated with the format type. Namely, Format 1 indicates the pseudo channel, while Format 2 does not.

Other descriptions herein refer to a system configuration where when a second BCOM command is send directly consecutive to the first BCOM command, the second format (Format 2) is always used. In the alternative of Table 410 and Table 430, such an assumption would not be valid. Rather, the system can select whether to use Format 1 or Format 2, depending on the delay offset desired (where the system uses Format 1 when a delay offset of zero is desired).

Figure 5:
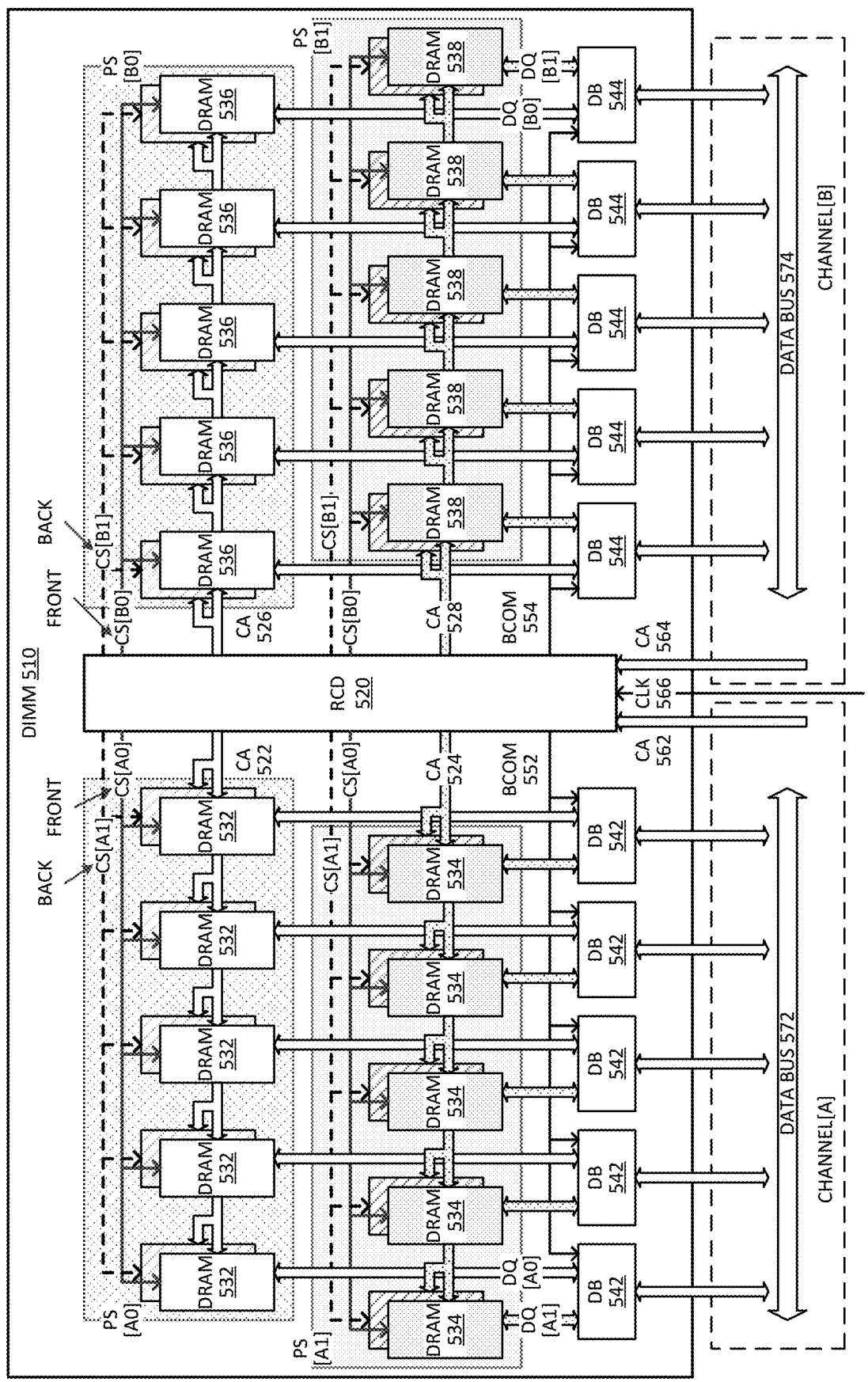
FIG. 5 is a block diagram of an example of an LRDIMM with two pseudo channels.

FIG. 5 is a block diagram of an example of an LRDIMM with two pseudo channels. System 500 represents a system in accordance with an example of system 100. System 500 specifically illustrates DIMM (dual inline memory module) 510, which can be considered an LRDIMM because it includes data buffers. In one example, the control of the BCOM commands described with reference to the DIMM can be applied to a stacked device or stacked module.

System 500 illustrates one example of DIMM 510 with RCD (registered clock driver) 520, memory devices, and data buffers. RCD 520 represents a controller for DIMM 510. In one example, RCD 520 receives information from a host or a memory controller, and buffers the command signals to the memory devices over a CA bus to the memory devices.

The memory devices are represented as DRAM devices, with different ranks as indicated by the different select lines (CS[0] and CS[1]) and different pseudo channels (PS[0] and PS[1]). More specifically, DIMM 510 includes two sub channels, sub channel 0 or sub channel A, and sub channel 1 or sub channel B. DRAMs 532 are part of PS[0] for sub channel A (PS[A0]) and receive command information over CA 522, with selection via CS[A0] for the "front" devices and via CS[A1] for the "back" devices. It will be understood that front devices refer to the devices on the same side of the DIMM PCB (printed circuit board) as the RCD, while the back devices refer to the devices on the opposite side of the DIMM PCB on which the RCD is mounted.

DRAMs 534 are part of PS[1] for sub channel A (PS[A1]) and receive command information over CA 524, with selection via CS[A0] for the front devices and via CS[A1] for the back devices. DRAMs 536 are part of PS[0] for sub channel B (PS[B0]) and receive command information over CA 526, with selection via CS[B0] for the front devices and via CS[B1] for the back devices. DRAMs 538 are part of PS[1] for sub channel B (PS[B1]) and receive command information over CA 528, with selection via CS[B0] for the front devices and via CS[B1] for the back devices.

DIMM 510 includes data buffers (DB) 542 for sub channel A and data buffers (DB) 544 for sub channel B. Thus, in accordance with one implementation, a data buffer can be one of multiple data buffers for a pseudo channel. In one example, a data buffer can buffer data for both pseudo channels. In one example, the data buffers buffer data for memory devices that are part of both pseudo channels. The BCOM commands would not need to specify pseudo channel or have the directly consecutive commands referred to above if the data buffers were specific to a pseudo channel.

In one example, DIMM 510 is a DDR5 LRDIMM implementation with a single RCD 520 and multiple data buffers, data buffers 542 for sub channel A and data buffers 544 for sub channel B. RCD 520 can receive the commands from the host and pass a subset of the commands to the data buffers to trigger them to properly transmit or transfer the data between the DRAMs and the host controller.

DIMM 510 represents BCOM bus 552 for data buffers 542 and BCOM bus 554 for data buffers 544. In one example, the BCOM buses are 5 wire buses. In one example, RCD 520 sends Read and Write commands as the primary commands to the data buffers over the BCOM buses. RCD 520 can send the BCOM commands with very specific timing to ensure the data buffers know exactly when to transfer data.

As illustrated, DIMM 510 includes two pseudo channels, and can thus be considered an implementation of an MCR DIMM, which is form of LRDIMM that divides the DRAMs into two pseudo channels which can transfer data simultaneously. In one example, the data buffers time multiplex the data from both pseudo channels onto the host bus.

System 500 includes data bus 572 for sub channel A and data bus 574 for sub channel B. System 500 includes CA bus 562 to provide commands for sub channel A from the host to RCD 520 and CA bus 564 to provide commands for sub channel B from the host to RCD 520. RCD 520 can receive and decode commands on CA bus 562 to provide commands on CA 522 and on CA 524. RCD 520 can receive and decode commands on CA bus 564 to provide command on CA 526 and on CA 528.

DIMM 510 illustrates different data buses between the DRAMs and the data buffers. To simplify the diagram, not all data buses between the DRAMs and the data buffers are labeled. Instead, only one data bus for each pseudo channel is labeled. More specifically, DRAMs 532 can couple to data buffers 542 via data (DQ) buses DQ[A0], DRAMs 534 can couple to data buffers 542 via data buses DQ[A1], DRAMs 536 can couple to data buffers 544 via data buses DQ[B0], and DRAMs 538 can couple to data buffers 544 via data buses DQ[B1].

In one example, the host data bus operates at twice the data rate of the DRAMs to accommodate the two pseudo channels. Thus, for example, the transfer speed of data bus 572 can be twice the transfer speed of DQ[A0] and DQ[A1]. Similarly, the transfer speed of data bus 574 can be twice the transfer speed of DQ[B0] and DQ[B1], where the transfer speed of data bus 572 and data bus 574 can be equal to each other.

In one example, the host command bus operates at twice the data rate of the DRAMs to accommodate the two pseudo channels. Thus, for example, the transfer speed of CA bus 562 can be twice the transfer speed of CA 522 and CA 524. Similarly, the transfer speed of CA bus 564 can be twice the transfer speed of CA 526 and CA 528, where the transfer speed of CA bus 562 and CA bus 564 can be equal to each other.

In one example, clock (CLK) 566 represents a clock or timing signal for the commands from the host to RCD 520. The data buses can have their own clock signals (e.g., DQS or data strobe), which are not specifically shown.

In one example, read commands and write commands in system 500 use 5 transfers on the BCOM bus, and the read and write commands must be at least 8 clocks apart from each other. If data takes 8 clocks to transfer, there is plenty of bandwidth to provide the BCOM commands as described above. System 500 can ensure that the data will always be sent a specific number of clocks after the BCOM command to ensure that with the BCOM command signaling described, the DRAMs, host, and data buffers can remain in sync for the data transfers.

As illustrated in system 500, there can be a logical layout to the groupings of DRAMs. For example, as illustrated, sub channels can be organized as right side versus left side of the RCD, ranks can be organized as front and back of the DIMM, and pseudo channels can be organized as upper row versus lower row. Other configurations are possible. A standard DDR5 DIMM has two sub channels. In one example, an MCR DIMM has two sub channels, with 2 pseudo channels per sub channel. In one example, data buffers 542 time multiplex data from PS[A0] and PS[A1] on data bus 572, and data buffers 544 time multiplex data from PS[B0] and PS[B1] on data bus 574. When the pseudo channels share data buffers, the pseudo channels must transfer data in the same direction, as mentioned previously.

Figure 6:
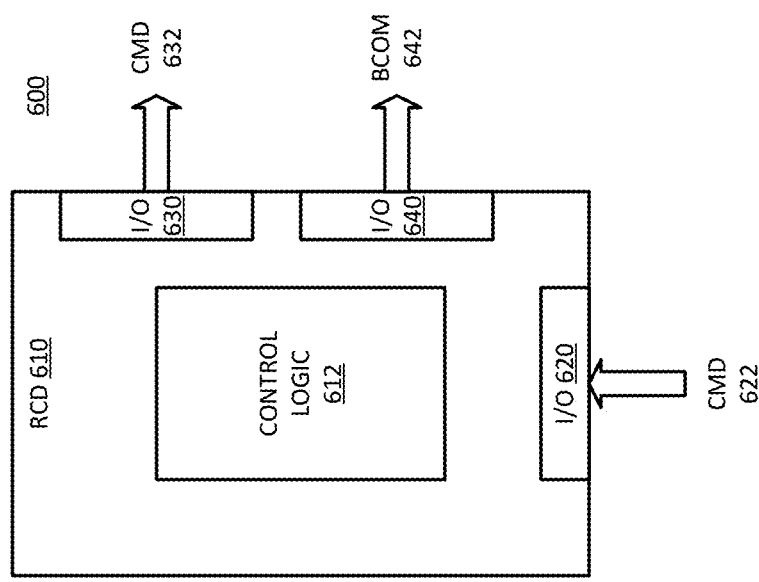
FIG. 6 is a block diagram of an example of a registered clock driver.

FIG. 6 is a block diagram of an example of a registered clock driver. System 600 represents an RCD in accordance with system 100 or system 500. RCD 610 can be a controller for a DIMM or other memory module having data buffers. RCD 610 includes I/O (input/output) 620, which represents a hardware interface to a command bus, represented by CMD (command) 622. I/O 620 enables RCD 610 to receive commands from the host or memory controller.

RCD 610 includes I/O 630, which represents a hardware interface to a command bus, represented by CMD (command) 632, over which RCD 610 can send commands to memory devices on the memory module. RCD 610 includes I/O 640, which represents a hardware interface to a BCOM bus, represented by BCOM 642, over which RCD 610 can send commands to data buffers on the memory module. Each I/O hardware interface can include signal line interfaces, transmit and/or receive circuitry, and control logic to manage the interface.

Control logic 612 represents logic to enable the operation of RCD 610. In one example, at least some of control logic 612 is implemented in hardware. In one example, at least some of control logic 612 is implemented in firmware/software. In one example, control logic 612 is implemented in a combination of hardware and software.

In one example, control logic 612 enables RCD 610 to determine when to use different BCOM command formats. In one example, RCD 610 can send BCOM commands of first and second formats, and determines when to send a BCOM command of the first format and when to send a command of the second format. Control logic 612 can generate BCOM commands to send via I/O 640 with formatting and timing in accordance with any example described. Control logic 612 can determine to send BCOM commands based on the use of pseudo channels in system 600.

Figure 7:
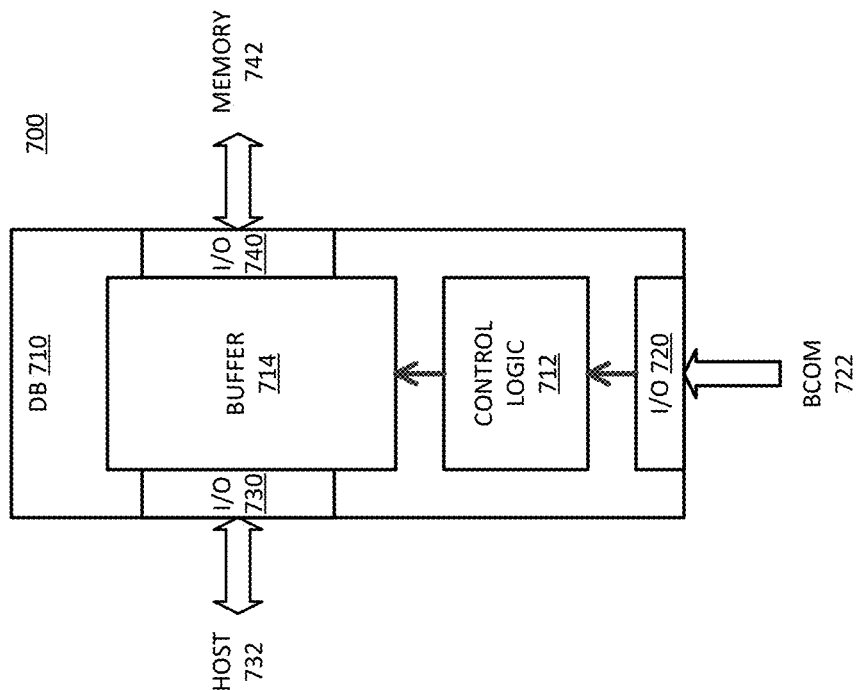
FIG. 7 is a block diagram of an example of a data buffer.

FIG. 7 is a block diagram of an example of a data buffer. System 700 represents a data buffer (DB) in accordance with system 100 or system 500. DB 710 can buffer data between memory device of a memory module and a host controller. DB 710 includes I/O 730, which represents a host-side or host facing hardware interface to a host data bus, represented by host 732. DB includes I/O 740, which represents a memory-side or memory facing hardware interface to with memory devices, represented by memory 742. Buffer 714 represents the buffer between I/O 730 and I/O 740.

DB 710 includes I/O 720, which represents a hardware interface to a BCOM bus, represented by BCOM 722. BCOM 722 enables DB 710 to receive commands from an RCD (not specifically shown). Each I/O hardware interface can include signal line interfaces, transmit and/or receive circuitry, and control logic to manage the interface.

Control logic 712 represents logic to enable the operation of DB 710. In one example, at least some of control logic 712 is implemented in hardware. In one example, at least some of control logic 712 is implemented in firmware/software. In one example, control logic 712 is implemented in a combination of hardware and software.

In one example, control logic 712 enables DB to receive and decode BCOM commands from an RCD. The BCOM commands indicate the timing of data access operations, which directs DB 710 which side of the data to receive from and which side to transfer to (e.g., from memory side to host side or from host side to memory side), and what the timing of the transfer is. In one example, control logic 712 determines the specific timings, which can include decoding a timing offset indicated by a second of two consecutive BCOM commands directed to different pseudo channels. DB 710 can receive BCOM commands of first and second formats, and determine data transfer timings based on the BCOM commands in accordance with any example described.

Figure 8:
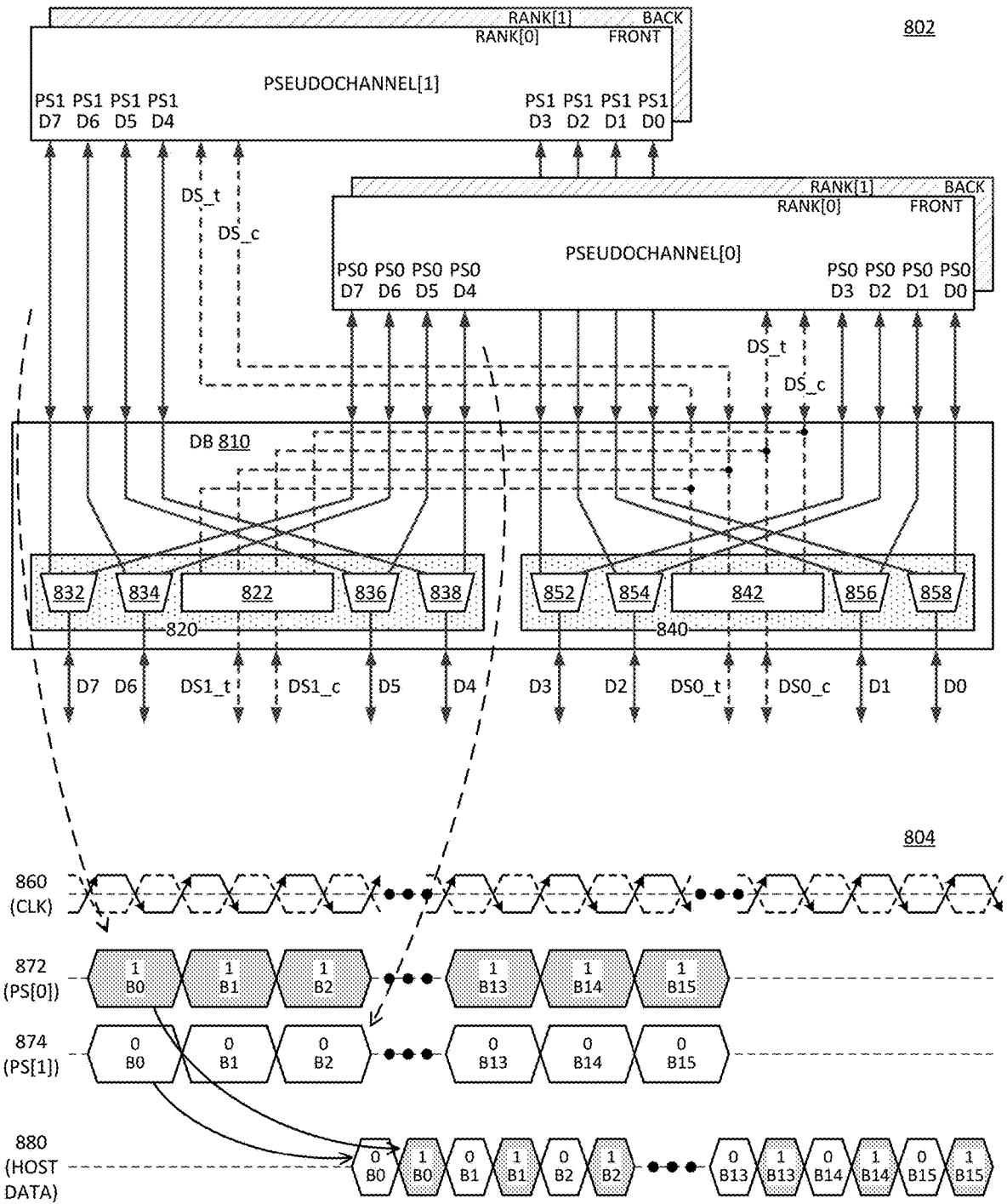
FIG. 8 is a block diagram of an example of data timing for a system with pseudo channels.

FIG. 8 is a block diagram of an example of data timing for a system with pseudo channels. System 802 represents a memory module system in accordance with an example of system 100 or system 500. System 802 includes memory devices of different pseudo channels coupled to a data buffer.

Pseudochannel[0] (referred to as PS[0] for simplicity) represents DRAM devices (e.g., front and back devices) for Rank[0] and Rank[1] devices of a first pseudo channel. Pseudochannel[1] (referred to as PS[1] for simplicity) represents DRAM devices for Rank[0] and Rank[1] of a second pseudo channel. As illustrated, the DRAM devices are ×8 devices, having 8 data interface signals. In an alternate implementation, the system can have ×4 DRAM devices. PS[0] includes data interfaces PS0[D7:D0] and PS[1] includes data interfaces PS1[D7:D0]. The DRAM devices also include interfaces for clock or timing signals, identified as DS_t (data strobe signal) and DS_c (data strobe complement).

DB 810 represents a data buffer in accordance with any example herein. In one example, DB 810 includes interface hardware 820 with retimer 822 to manage the synchronization of the clock signal from the host bus with the timing signals on the memory module for data signals D[7:4] of the host data bus with associated data strobe DS1_t and DS1_c. In one example, DB 810 includes interface hardware 840 with retimer 842 to manage the synchronization of the clock signal from the host bus with the timing signals on the memory module for data signals D[3:0] of the host data bus with associated data strobe DS0_t and DS0_c.

In one example, interface hardware 820 includes mux (multiplexer) 832 to select D7 between PS[0] and PS[1], mux 834 to select D6 between PS[0] and PS[1], mux 836 to select D5 between PS[0] and PS[1], and mux 838 to select D4 between PS[0] and PS[1]. In one example, interface hardware 840 includes mux (multiplexer) 852 to select D3 between PS[0] and PS[1], mux 854 to select D2 between PS[0] and PS[1], mux 856 to select D1 between PS[0] and PS[1], and mux 858 to select D0 between PS[0] and PS[1].

Diagram 804 provides a data timing diagram for system 802. Signal 860 represents a clock (CLK) signal, which can be the combination of DS_t and DS_c. Signal 872 represents the PS[0] data, which represents a BL16 burst for all the data interfaces. Signal 874 represents the PS[1] data, which represents a BL16 burst for all the data interfaces. In one example, as illustrated, the data on the memory module for the two pseudo channels takes two clock cycles for transfer.

Signal 880 represents the host data, and includes two interleaved BL16 bursts of data. Diagram 804 illustrates that DB 810 interleaves lower speed communication and puts it back to host at double speed for a read, and de-interleaves data double speed data from the host to lower speed communication for a write. Thus, signal 880 illustrates the read data bits sent to the host interleaved, where each data bit is transmitted at one clock cycle instead of two clock cycles.

Figure 9:
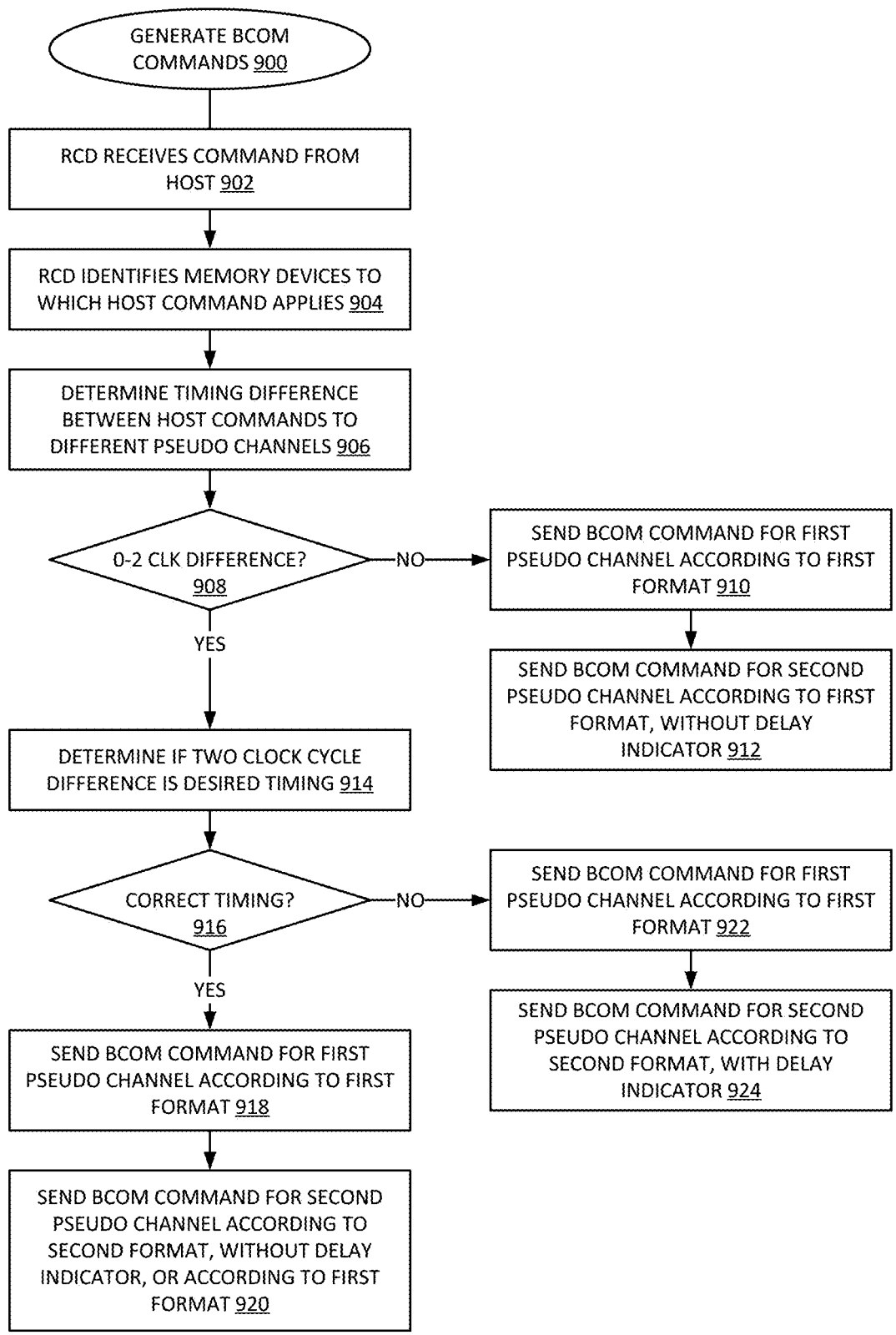
FIG. 9 is a flow diagram of an example of a process for BCOM command generation by an RCD.

FIG. 9 is a flow diagram of an example of a process for BCOM command generation by an RCD. Process 900 represents an example of a process for an RCD to generate and send BCOM commands, and can be performed by an RCD in accordance with any example herein.

The RCD can receive commands from the host, at 902. The RCD can decode the command from the host and identify the memory devices to which the command applies, at 904. The identification can include determining how to address the memory devices of different pseudo channels. The RCD generates commands to the memory devices and commands to associated data buffers to prepare to transfer data for the command with the correct timing.

In one example, the RCD determines the timing difference between BCOM commands to different pseudo channels, at 906. In one example, the RCD will determine what format of BCOM command to send based on the timing of the incoming host commands. The difference of zero to two clock cycles can trigger the RCD to apply a timing of the BCOM commands where a second BCOM command to one pseudo channel will directly follow a first BCOM to the other pseudo channel, with an offset to indicate the desired timing.

If the difference is more than 2 clock cycles (CLK) or a difference that would align the BCOM command one after the other with intervening clock cycles, at 908 NO branch, the RCD can send a first BCOM command for the first pseudo channel according to a first BCOM command format, at 910. In one example, the RCD sends a second BCOM command after a delay of more than 2 clock cycles for the second pseudo channel according to the first BCOM command format, at 912. The first format will not have a delay offset indication.

In one example, if there is a 0-2 CLK difference in BCOM commands, at 908 YES branch, in one example, the RCD determines if the difference is exactly two clock cycles and whether the two clock cycle difference is the desired timing for the second BCOM command, at 914. If a two CLK difference is the correct timing for the second BCOM command, at 916 YES branch, the RCD can send the first BCOM command for the first pseudo channel according to a first BCOM command format, at 918. In one example, the RCD sends a second BCOM command for the second pseudo channel according to a second BCOM command format without a delay indicator, at 920. Alternatively, the RCD can send a second BCOM command with a delay indicator of 2 CLK cycles to indicate the 2 CLK delay. Alternatively, depending on the BCOM command format, the RCD can send the second BCOM for the second pseudo channel according to the first BCOM command format, for a format that provides sufficient information for the data buffers to generate the correct timing for the correct data signals.

In one example, if the 2 CLK difference is not the correct timing, there is a 0 or 1 CLK difference, at 916 NO branch. In one example, the RCD determines what is the desired timing for the second BCOM command and generates the command accordingly. The RCD can then send the first BCOM command for the first pseudo channel according to a first format, at 922, and then send the second BCOM command for the second pseudo channel according to a second format, with a delay indicator to indicate a delay relative to the first BCOM command, at 924.

Figure 10:
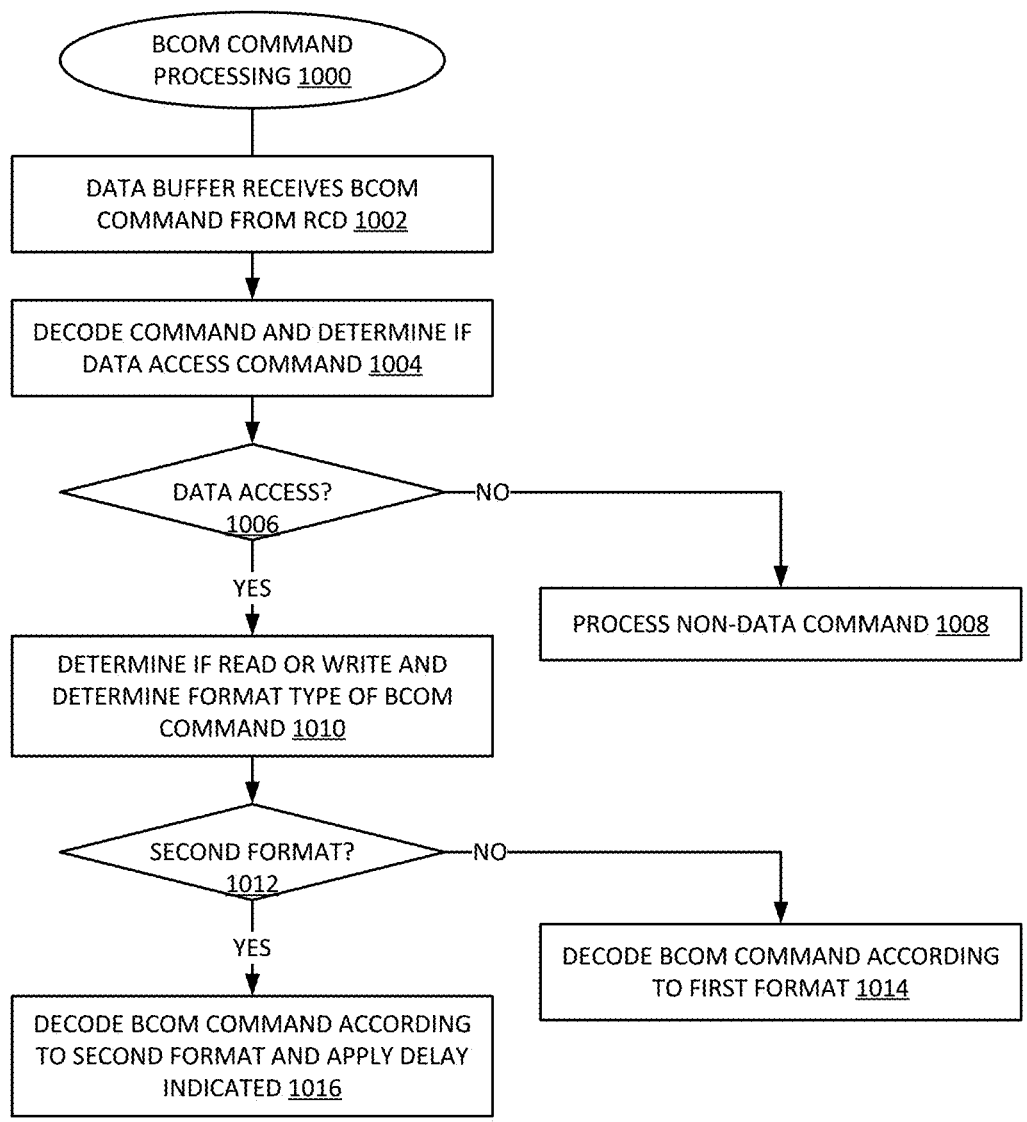
FIG. 10 is a flow diagram of an example of a process for BCOM command processing by a data buffer.

FIG. 10 is a flow diagram of an example of a process for BCOM command processing by a data buffer. Process 1000 represents an example of a process for a data buffer to receive and process BCOM commands, and can be performed by a data buffer in accordance with any example herein.

The data buffer can receive a BCOM command from the RCD, at 1002. The data buffer can decode the BCOM command determine if the command is directed to a data access command, at 1004. The data access commands refer to read commands and write commands, which involve a data transfer, which will trigger the data buffer to transfer data from host to memory (write) or from memory to host (read).

If the command is not directed to data access, at 1006 NO branch, the data buffer can process the non-data command, at 1008. If the command is directed to data access, at 1006 YES branch, in one example, the data buffer can determine if the command is a read command, a write command, and determine a format type of the BCOM command, at 1010. The BCOM command can specify the command type in the command.

In one example, the data buffer can determine from the BCOM command what the format of the BCOM command is based on a field in the command, which indicates its format type (e.g., either Format 1 or Format 2). In one example, the data buffer can determine the BCOM command format type simply by the timing of receipt of the command. For example, an implementation of the BCOM communication can specify that a second BCOM command received directly consecutive to a first BCOM command is a Format 2 command, and all other BCOM commands are Format 1. Thus, the determination can depend on the system configuration and potentially an indicator in the command itself.

If the BCOM command is not a second format command, at 1012 NO branch, the data buffer can decode the command according to a first format, at 1014. As described herein, the second format includes a timing delay indication, while the first format is understood to indicate command timing simply by the timing of when the command itself is sent.

If the BCOM command is a second format command, at 1012 YES branch, the data buffer can decode the command according to the second format and apply the delay indicated, at 1016. The delay can be decoded and applied differently based on the protocol used for the BCOM commands. The data buffer can apply the appropriate delay to ensure correct timing of a data transfer associated with the command.

Figure 11:
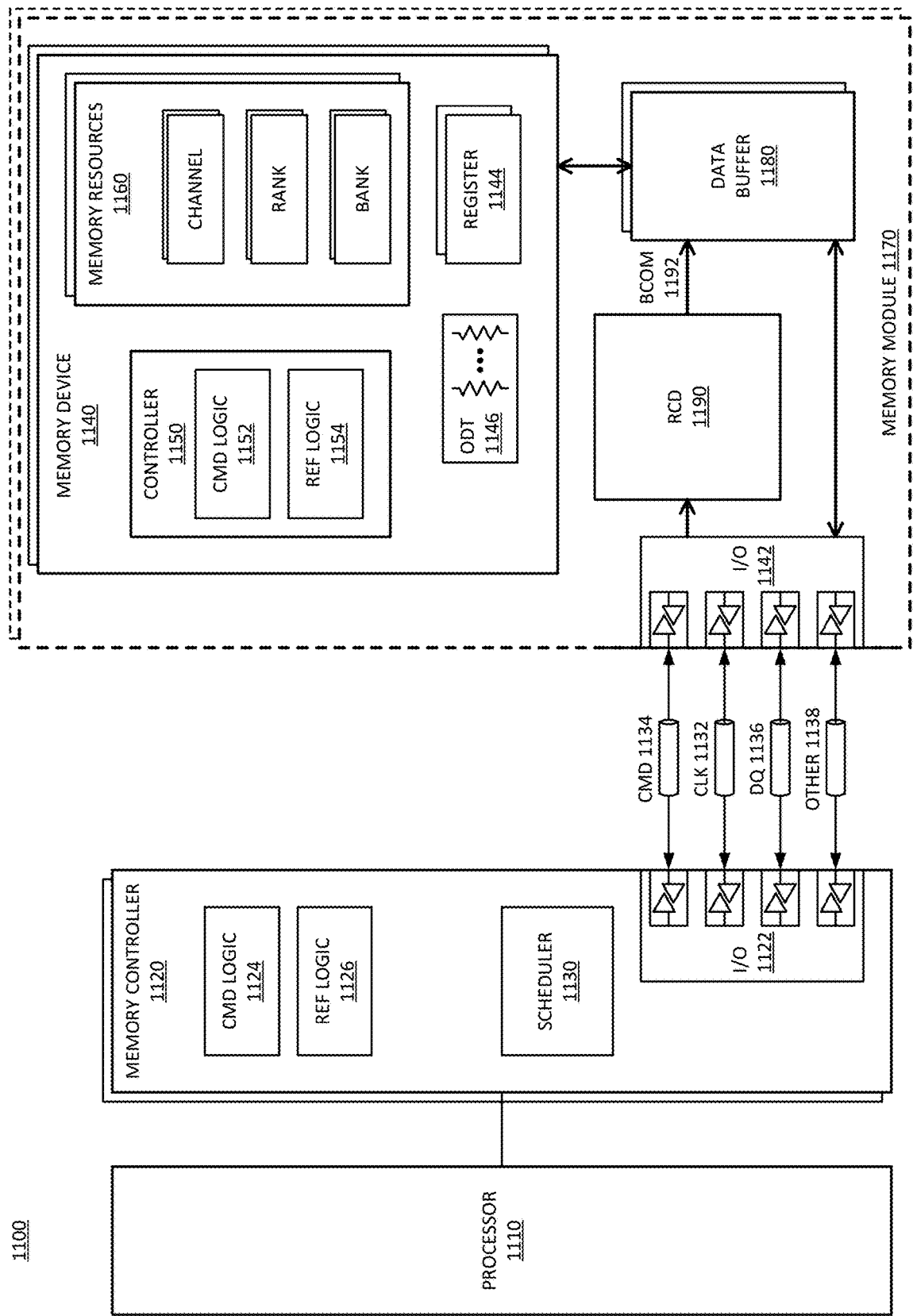
FIG. 11 is a block diagram of an example of a memory subsystem in which BCOM communication can be implemented.

FIG. 11 is a block diagram of an example of a memory subsystem in which BCOM communication can be implemented. System 1100 includes a processor and elements of a memory subsystem in a computing device. System 1100 represents a system in accordance with an example of system 100, system 500, or system 802.

In one example, memory module 1170 includes RCD 1190, which represents a registered clock driver in accordance with any example herein. In one example, memory module 1170 includes data buffers 1180, which represent data buffers in accordance with any example herein. Data buffers 1180 couple to DQ 1136 to buffer data transfer between memory devices 1140 and memory controller 1120. RCD 1190 can control the operation of data buffers 1180 through BCOM 1192. In one example, RCD 1190 manages memory devices 1140 as multiple pseudo channels and controls the data buffers for data access commands in accordance with first and second BCOM command formats, in accordance with any example herein.

Memory controller 1120 represents one or more memory controller circuits or devices for system 1100. Memory controller 1120 represents control logic that generates memory access commands in response to the execution of operations by processor 1110. Memory controller 1120 accesses one or more memory devices 1140. Memory devices 1140 can be DRAM devices in accordance with any referred to above. In one example, memory devices 1140 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. Coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

In one example, settings for each channel are controlled by separate mode registers or other register settings. In one example, each memory controller 1120 manages a separate memory channel, although system 1100 can be configured to have multiple channels managed by a single controller, or to have multiple controllers on a single channel. In one example, memory controller 1120 is part of host processor 1110, such as logic implemented on the same die or implemented in the same package space as the processor.

Processor 1110 represents a processing unit of a computing platform that may execute an operating system (OS) and applications, which can collectively be referred to as the host or the user of the memory. The OS and applications execute operations that result in memory accesses. Processor 1110 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or hard disk controller. Such devices can be integrated with the processor in some systems or attached to the processer via a bus (e.g., PCI express), or a combination. System 1100 can be implemented as an SOC (system on a chip), or be implemented with standalone components.

Reference to memory devices can apply to different memory types. Memory devices often refers to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random-access memory), or some variant such as synchronous DRAM (SDRAM). A memory subsystem as described herein may be compatible with a number of memory technologies, such as DDR4 (double data rate version 4, JESD79-4, originally published in September 2012 by JEDEC (Joint Electron Device Engineering Council, now the JEDEC Solid State Technology Association), LPDDR4 (low power DDR version 4, JESD209-4, originally published by JEDEC in August 2014), WIO2 (Wide I/O 2 (WideIO2), JESD229-2, originally published by JEDEC in August 2014), HBM (high bandwidth memory DRAM, JESD235A, originally published by JEDEC in November 2015), DDR5 (DDR version 5, JESD79-5, originally published by JEDEC in July 2020), LPDDR5 (LPDDR version 5, JESD209-5, originally published by JEDEC in February 2019), HBM2 ((HBM version 2), currently in discussion by JEDEC), or others or combinations of memory technologies, and technologies based on derivatives or extensions of such specifications.

Memory controller 1120 includes I/O interface logic 1122 to couple to a memory bus, such as a memory channel as referred to above. I/O interface logic 1122 (as well as I/O interface logic 1142 of memory device 1140) can include pins, pads, connectors, signal lines, traces, or wires, or other hardware to connect the devices, or a combination of these. I/O interface logic 1122 can include a hardware interface. As illustrated, I/O interface logic 1122 includes at least drivers/transceivers for signal lines. Commonly, wires within an integrated circuit interface couple with a pad, pin, or connector to interface signal lines or traces or other wires between devices. I/O interface logic 1122 can include drivers, receivers, transceivers, or termination, or other circuitry or combinations of circuitry to exchange signals on the signal lines between the devices. The exchange of signals includes at least one of transmit or receive. While shown as coupling I/O 1122 from memory controller 1120 to I/O 1142 of memory device 1140, it will be understood that in an implementation of system 1100 where groups of memory devices 1140 are accessed in parallel, multiple memory devices can include I/O interfaces to the same interface of memory controller 1120. In an implementation of system 1100 including one or more memory modules 1170, I/O 1142 can include interface hardware of the memory module in addition to interface hardware on the memory device itself. Other memory controllers 1120 will include separate interfaces to other memory devices 1140.

The bus between memory controller 1120 and memory devices 1140 can be implemented as multiple signal lines coupling memory controller 1120 to memory devices 1140. The bus may typically include at least clock (CLK) 1132, command/address (CMD) 1134, and write data (DQ) and read data (DQ) 1136, and zero or more other signal lines 1138. In one example, a bus or connection between memory controller 1120 and memory can be referred to as a memory bus. In one example, the memory bus is a multi-drop bus. The signal lines for CMD can be referred to as a "C/A bus" (or ADD/CMD bus, or some other designation indicating the transfer of commands (C or CMD) and address (A or ADD) information) and the signal lines for write and read DQ can be referred to as a "data bus." In one example, independent channels have different clock signals, C/A buses, data buses, and other signal lines. Thus, system 1100 can be considered to have multiple "buses," in the sense that an independent interface path can be considered a separate bus. It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 1120 and memory devices 1140. An example of a serial bus technology is 8B10B encoding and transmission of high-speed data with embedded clock over a single differential pair of signals in each direction. In one example, CMD 1134 represents signal lines shared in parallel with multiple memory devices. In one example, multiple memory devices share encoding command signal lines of CMD 1134, and each has a separate chip select (CS_n) signal line to select individual memory devices.

It will be understood that in the example of system 1100, the bus between memory controller 1120 and memory devices 1140 includes a subsidiary command bus CMD 1134 and a subsidiary bus to carry the write and read data, DQ 1136. In one example, the data bus can include bidirectional lines for read data and for write/command data. In another example, the subsidiary bus DQ 1136 can include unidirectional write signal lines for write and data from the host to memory, and can include unidirectional lines for read data from the memory to the host. In accordance with the chosen memory technology and system design, other signals 1138 may accompany a bus or sub bus, such as strobe lines DQS. Based on design of system 1100, or implementation if a design supports multiple implementations, the data bus can have more or less bandwidth per memory device 1140. For example, the data bus can support memory devices that have either a ×4 interface, a ×8 interface, a ×16 interface, or other interface. The convention "xW," where W is an integer that refers to an interface size or width of the interface of memory device 1140, which represents a number of signal lines to exchange data with memory controller 1120. The interface size of the memory devices is a controlling factor on how many memory devices can be used concurrently per channel in system 1100 or coupled in parallel to the same signal lines. In one example, high bandwidth memory devices, wide interface devices, or stacked memory configurations, or combinations, can enable wider interfaces, such as a ×128 interface, a ×256 interface, a ×512 interface, a ×1024 interface, or other data bus interface width.

In one example, memory devices 1140 and memory controller 1120 exchange data over the data bus in a burst, or a sequence of consecutive data transfers. The burst corresponds to a number of transfer cycles, which is related to a bus frequency. In one example, the transfer cycle can be a whole clock cycle for transfers occurring on a same clock or strobe signal edge (e.g., on the rising edge). In one example, every clock cycle, referring to a cycle of the system clock, is separated into multiple unit intervals (UIs), where each UI is a transfer cycle. For example, double data rate transfers trigger on both edges of the clock signal (e.g., rising and falling). A burst can last for a configured number of UIs, which can be a configuration stored in a register, or triggered on the fly. For example, a sequence of eight consecutive transfer periods can be considered a burst length eight (BL8), and each memory device 1140 can transfer data on each UI. Thus, a ×8 memory device operating on BL8 can transfer 64 bits of data (8 data signal lines times 8 data bits transferred per line over the burst). It will be understood that this simple example is merely an illustration and is not limiting.

Memory devices 1140 represent memory resources for system 1100. In one example, each memory device 1140 is a separate memory die. In one example, each memory device 1140 can interface with multiple (e.g., 2) channels per device or die. Each memory device 1140 includes I/O interface logic 1142, which has a bandwidth determined by the implementation of the device (e.g., ×16 or ×8 or some other interface bandwidth). I/O interface logic 1142 enables the memory devices to interface with memory controller 1120. I/O interface logic 1142 can include a hardware interface, and can be in accordance with I/O 1122 of memory controller, but at the memory device end. In one example, multiple memory devices 1140 are connected in parallel to the same command and data buses. In another example, multiple memory devices 1140 are connected in parallel to the same command bus, and are connected to different data buses. For example, system 1100 can be configured with multiple memory devices 1140 coupled in parallel, with each memory device responding to a command, and accessing memory resources 1160 internal to each. For a Write operation, an individual memory device 1140 can write a portion of the overall data word, and for a Read operation, an individual memory device 1140 can fetch a portion of the overall data word. The remaining bits of the word will be provided or received by other memory devices in parallel.

In one example, memory devices 1140 are disposed directly on a motherboard or host system platform (e.g., a PCB (printed circuit board) on which processor 1110 is disposed) of a computing device. In one example, memory devices 1140 can be organized into memory modules 1170. In one example, memory modules 1170 represent dual inline memory modules (DIMMs). In one example, memory modules 1170 represent other organization of multiple memory devices to share at least a portion of access or control circuitry, which can be a separate circuit, a separate device, or a separate board from the host system platform. Memory modules 1170 can include multiple memory devices 1140, and the memory modules can include support for multiple separate channels to the included memory devices disposed on them. In another example, memory devices 1140 may be incorporated into the same package as memory controller 1120, such as by techniques such as multi-chip-module (MCM), package-on-package, through-silicon via (TSV), or other techniques or combinations. Similarly, in one example, multiple memory devices 1140 may be incorporated into memory modules 1170, which themselves may be incorporated into the same package as memory controller 1120. It will be appreciated that for these and other implementations, memory controller 1120 may be part of host processor 1110.

Memory devices 1140 each include one or more memory arrays 1160. Memory array 1160 represents addressable memory locations or storage locations for data. Typically, memory array 1160 is managed as rows of data, accessed via wordline (rows) and bitline (individual bits within a row) control. Memory array 1160 can be organized as separate channels, ranks, and banks of memory. Channels may refer to independent control paths to storage locations within memory devices 1140. Ranks may refer to common locations across multiple memory devices (e.g., same row addresses within different devices) in parallel. Banks may refer to sub-arrays of memory locations within a memory device 1140. In one example, banks of memory are divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one example, memory devices 1140 include one or more registers 1144. Register 1144 represents one or more storage devices or storage locations that provide configuration or settings for the operation of the memory device. In one example, register 1144 can provide a storage location for memory device 1140 to store data for access by memory controller 1120 as part of a control or management operation. In one example, register 1144 includes one or more Mode Registers. In one example, register 1144 includes one or more multipurpose registers. The configuration of locations within register 1144 can configure memory device 1140 to operate in different "modes," where command information can trigger different operations within memory device 1140 based on the mode. Additionally or in the alternative, different modes can also trigger different operation from address information or other signal lines depending on the mode. Settings of register 1144 can indicate configuration for I/O settings (e.g., timing, termination or ODT (on-die termination) 1146, driver configuration, or other I/O settings).

In one example, memory device 1140 includes ODT 1146 as part of the interface hardware associated with I/O 1142. ODT 1146 can be configured as mentioned above, and provide settings for impedance to be applied to the interface to specified signal lines. In one example, ODT 1146 is applied to DQ signal lines. In one example, ODT 1146 is applied to command signal lines. In one example, ODT 1146 is applied to address signal lines. In one example, ODT 1146 can be applied to any combination of the preceding. The ODT settings can be changed based on whether a memory device is a selected target of an access operation or a non-target device. ODT 1146 settings can affect the timing and reflections of signaling on the terminated lines. Careful control over ODT 1146 can enable higher-speed operation with improved matching of applied impedance and loading. ODT 1146 can be applied to specific signal lines of I/O interface 1142, 1122 (for example, ODT for DQ lines or ODT for CA lines), and is not necessarily applied to all signal lines.

Memory device 1140 includes controller 1150, which represents control logic within the memory device to control internal operations within the memory device. For example, controller 1150 decodes commands sent by memory controller 1120 and generates internal operations to execute or satisfy the commands. Controller 1150 can be referred to as an internal controller, and is separate from memory controller 1120 of the host. Controller 1150 can determine what mode is selected based on register 1144, and configure the internal execution of operations for access to memory resources 1160 or other operations based on the selected mode. Controller 1150 generates control signals to control the routing of bits within memory device 1140 to provide a proper interface for the selected mode and direct a command to the proper memory locations or addresses. Controller 1150 includes command logic 1152, which can decode command encoding received on command and address signal lines. Thus, command logic 1152 can be or include a command decoder. With command logic 1152, memory device can identify commands and generate internal operations to execute requested commands.

Referring again to memory controller 1120, memory controller 1120 includes command (CMD) logic 1124, which represents logic or circuitry to generate commands to send to memory devices 1140. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 1140, memory controller 1120 can issue commands via I/O 1122 to cause memory device 1140 to execute the commands. In one example, controller 1150 of memory device 1140 receives and decodes command and address information received via I/O 1142 from memory controller 1120. Based on the received command and address information, controller 1150 can control the timing of operations of the logic and circuitry within memory device 1140 to execute the commands. Controller 1150 is responsible for compliance with standards or specifications within memory device 1140, such as timing and signaling requirements. Memory controller 1120 can implement compliance with standards or specifications by access scheduling and control.

Memory controller 1120 includes scheduler 1130, which represents logic or circuitry to generate and order transactions to send to memory device 1140. From one perspective, the primary function of memory controller 1120 could be said to schedule memory access and other transactions to memory device 1140. Such scheduling can include generating the transactions themselves to implement the requests for data by processor 1110 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 1120 typically includes logic such as scheduler 1130 to allow selection and ordering of transactions to improve performance of system 1100. Thus, memory controller 1120 can select which of the outstanding transactions should be sent to memory device 1140 in which order, which is typically achieved with logic much more complex that a simple first-in first-out algorithm. Memory controller 1120 manages the transmission of the transactions to memory device 1140, and manages the timing associated with the transaction. In one example, transactions have deterministic timing, which can be managed by memory controller 1120 and used in determining how to schedule the transactions with scheduler 1130.

In one example, memory controller 1120 includes refresh (REF) logic 1126. Refresh logic 1126 can be used for memory resources that are volatile and need to be refreshed to retain a deterministic state. In one example, refresh logic 1126 indicates a location for refresh, and a type of refresh to perform. Refresh logic 1126 can trigger self-refresh within memory device 1140, or execute external refreshes which can be referred to as auto refresh commands) by sending refresh commands, or a combination. In one example, controller 1150 within memory device 1140 includes refresh logic 1154 to apply refresh within memory device 1140. In one example, refresh logic 1154 generates internal operations to perform refresh in accordance with an external refresh received from memory controller 1120. Refresh logic 1154 can determine if a refresh is directed to memory device 1140, and what memory resources 1160 to refresh in response to the command.

Figure 12:
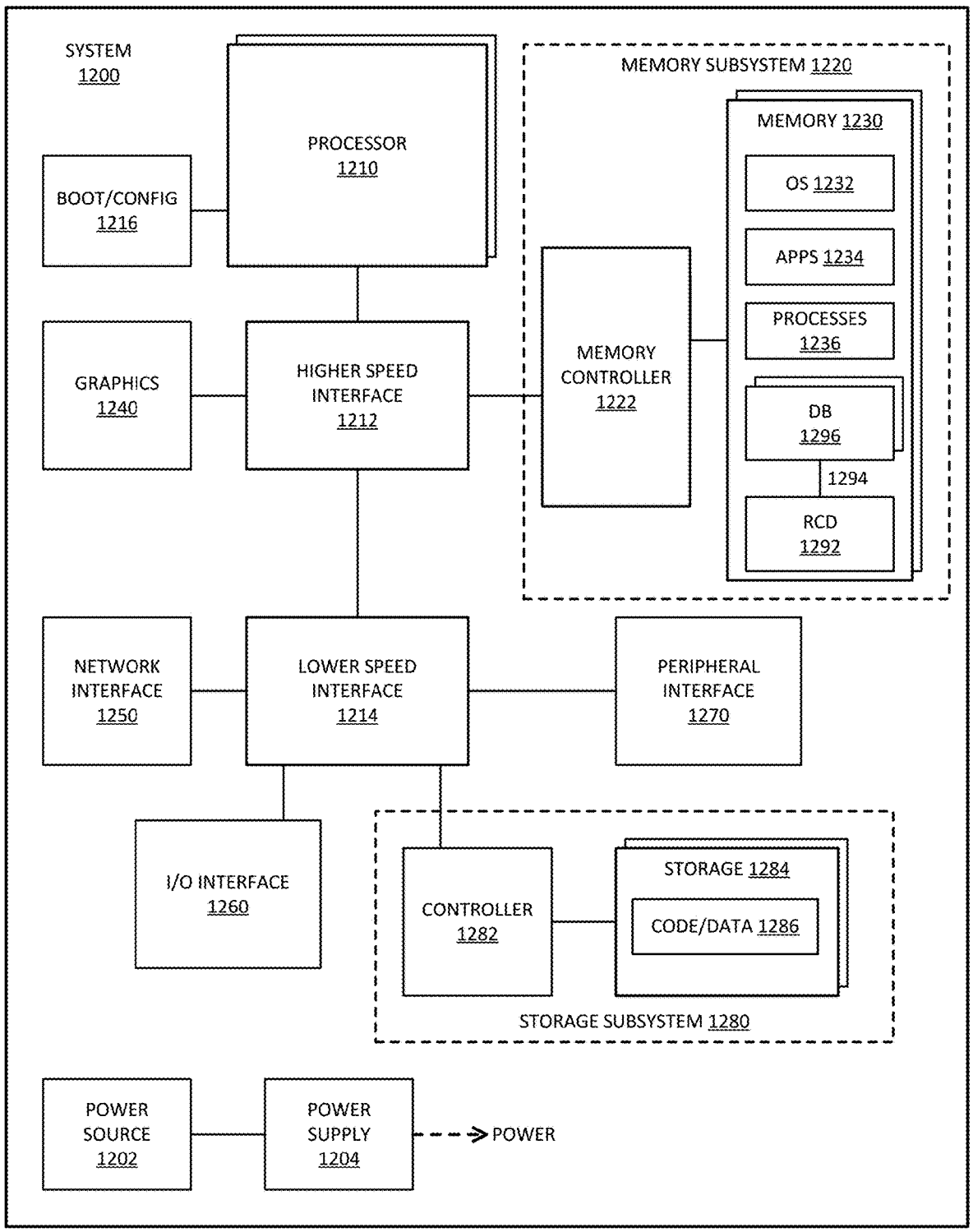
FIG. 12 is a block diagram of an example of a computing system in which BCOM communication can be implemented.

FIG. 12 is a block diagram of an example of a computing system in which BCOM communication can be implemented. System 1200 represents a computing device in accordance with any example herein, and can be a laptop computer, a desktop computer, a tablet computer, a server, a gaming or entertainment control system, embedded computing device, or other electronic device.

System 1200 represents a system in accordance with an example of system 100, system 500, or system 802. In one example, memory subsystem 1220 includes a memory module with memory 1230. Memory 1230 can represent the memory module, which includes RCD 1292, which represents a registered clock driver in accordance with any example herein, and data buffers (DBs) 1296, which represent data buffers in accordance with any example herein. DBs 1296 buffer data transfer between memory devices of memory 1230 and memory controller 1222. RCD 1292 can control the operation of data buffers 1296 through BCOM 1294. In one example, RCD 1292 manages memory devices of memory 1230 as multiple pseudo channels and controls the data buffers for data access commands in accordance with first and second BCOM command formats, in accordance with any example herein.

System 1200 includes processor 1210 can include any type of microprocessor, central processing unit (CPU), graphics processing unit (GPU), processing core, or other processing hardware, or a combination, to provide processing or execution of instructions for system 1200. Processor 1210 can be a host processor device. Processor 1210 controls the overall operation of system 1200, and can be or include, one or more programmable general-purpose or special-purpose microprocessors, digital signal processors (DSPs), programmable controllers, application specific integrated circuits (ASICs), programmable logic devices (PLDs), or a combination of such devices.

System 1200 includes boot/config 1216, which represents storage to store boot code (e.g., basic input/output system (BIOS)), configuration settings, security hardware (e.g., trusted platform module (TPM)), or other system level hardware that operates outside of a host OS. Boot/config 1216 can include a nonvolatile storage device, such as read-only memory (ROM), flash memory, or other memory devices.

In one example, system 1200 includes interface 1212 coupled to processor 1210, which can represent a higher speed interface or a high throughput interface for system components that need higher bandwidth connections, such as memory subsystem 1220 or graphics interface components 1240. Interface 1212 represents an interface circuit, which can be a standalone component or integrated onto a processor die. Interface 1212 can be integrated as a circuit onto the processor die or integrated as a component on a system on a chip. Where present, graphics interface 1240 interfaces to graphics components for providing a visual display to a user of system 1200. Graphics interface 1240 can be a standalone component or integrated onto the processor die or system on a chip. In one example, graphics interface 1240 can drive a high definition (HD) display or ultra high definition (UHD) display that provides an output to a user. In one example, the display can include a touchscreen display. In one example, graphics interface 1240 generates a display based on data stored in memory 1230 or based on operations executed by processor 1210 or both.

Memory subsystem 1220 represents the main memory of system 1200, and provides storage for code to be executed by processor 1210, or data values to be used in executing a routine. Memory subsystem 1220 can include one or more varieties of random-access memory (RAM) such as DRAM, 3DXP (three-dimensional crosspoint), or other memory devices, or a combination of such devices. Memory 1230 stores and hosts, among other things, operating system (OS) 1232 to provide a software platform for execution of instructions in system 1200. Additionally, applications 1234 can execute on the software platform of OS 1232 from memory 1230. Applications 1234 represent programs that have their own operational logic to perform execution of one or more functions. Processes 1236 represent agents or routines that provide auxiliary functions to OS 1232 or one or more applications 1234 or a combination. OS 1232, applications 1234, and processes 1236 provide software logic to provide functions for system 1200. In one example, memory subsystem 1220 includes memory controller 1222, which is a memory controller to generate and issue commands to memory 1230. It will be understood that memory controller 1222 could be a physical part of processor 1210 or a physical part of interface 1212. For example, memory controller 1222 can be an integrated memory controller, integrated onto a circuit with processor 1210, such as integrated onto the processor die or a system on a chip.

While not specifically illustrated, it will be understood that system 1200 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 1200 includes interface 1214, which can be coupled to interface 1212. Interface 1214 can be a lower speed interface than interface 1212. In one example, interface 1214 represents an interface circuit, which can include standalone components and integrated circuitry. In one example, multiple user interface components or peripheral components, or both, couple to interface 1214. Network interface 1250 provides system 1200 the ability to communicate with remote devices (e.g., servers or other computing devices) over one or more networks. Network interface 1250 can include an Ethernet adapter, wireless interconnection components, cellular network interconnection components, USB (universal serial bus), or other wired or wireless standards-based or proprietary interfaces. Network interface 1250 can exchange data with a remote device, which can include sending data stored in memory or receiving data to be stored in memory.

In one example, system 1200 includes one or more input/output (I/O) interface(s) 1260. I/O interface 1260 can include one or more interface components through which a user interacts with system 1200 (e.g., audio, alphanumeric, tactile/touch, or other interfacing). Peripheral interface 1270 can include any hardware interface not specifically mentioned above. Peripherals refer generally to devices that connect dependently to system 1200. A dependent connection is one where system 1200 provides the software platform or hardware platform or both on which operation executes, and with which a user interacts.

In one example, system 1200 includes storage subsystem 1280 to store data in a nonvolatile manner. In one example, in certain system implementations, at least certain components of storage 1280 can overlap with components of memory subsystem 1220. Storage subsystem 1280 includes storage device(s) 1284, which can be or include any conventional medium for storing large amounts of data in a nonvolatile manner, such as one or more magnetic, solid state, NAND, 3DXP, or optical based disks, or a combination. Storage 1284 holds code or instructions and data 1286 in a persistent state (i.e., the value is retained despite interruption of power to system 1200). Storage 1284 can be generically considered to be a "memory," although memory 1230 is typically the executing or operating memory to provide instructions to processor 1210. Whereas storage 1284 is nonvolatile, memory 1230 can include volatile memory (i.e., the value or state of the data is indeterminate if power is interrupted to system 1200). In one example, storage subsystem 1280 includes controller 1282 to interface with storage 1284. In one example controller 1282 is a physical part of interface 1214 or processor 1210, or can include circuits or logic in both processor 1210 and interface 1214.

Power source 1202 provides power to the components of system 1200. More specifically, power source 1202 typically interfaces to one or multiple power supplies 1204 in system 1200 to provide power to the components of system 1200. In one example, power supply 1204 includes an AC to DC (alternating current to direct current) adapter to plug into a wall outlet. Such AC power can be renewable energy (e.g., solar power) power source 1202. In one example, power source 1202 includes a DC power source, such as an external AC to DC converter. In one example, power source 1202 or power supply 1204 includes wireless charging hardware to charge via proximity to a charging field. In one example, power source 1202 can include an internal battery or fuel cell source.

Figure 13:
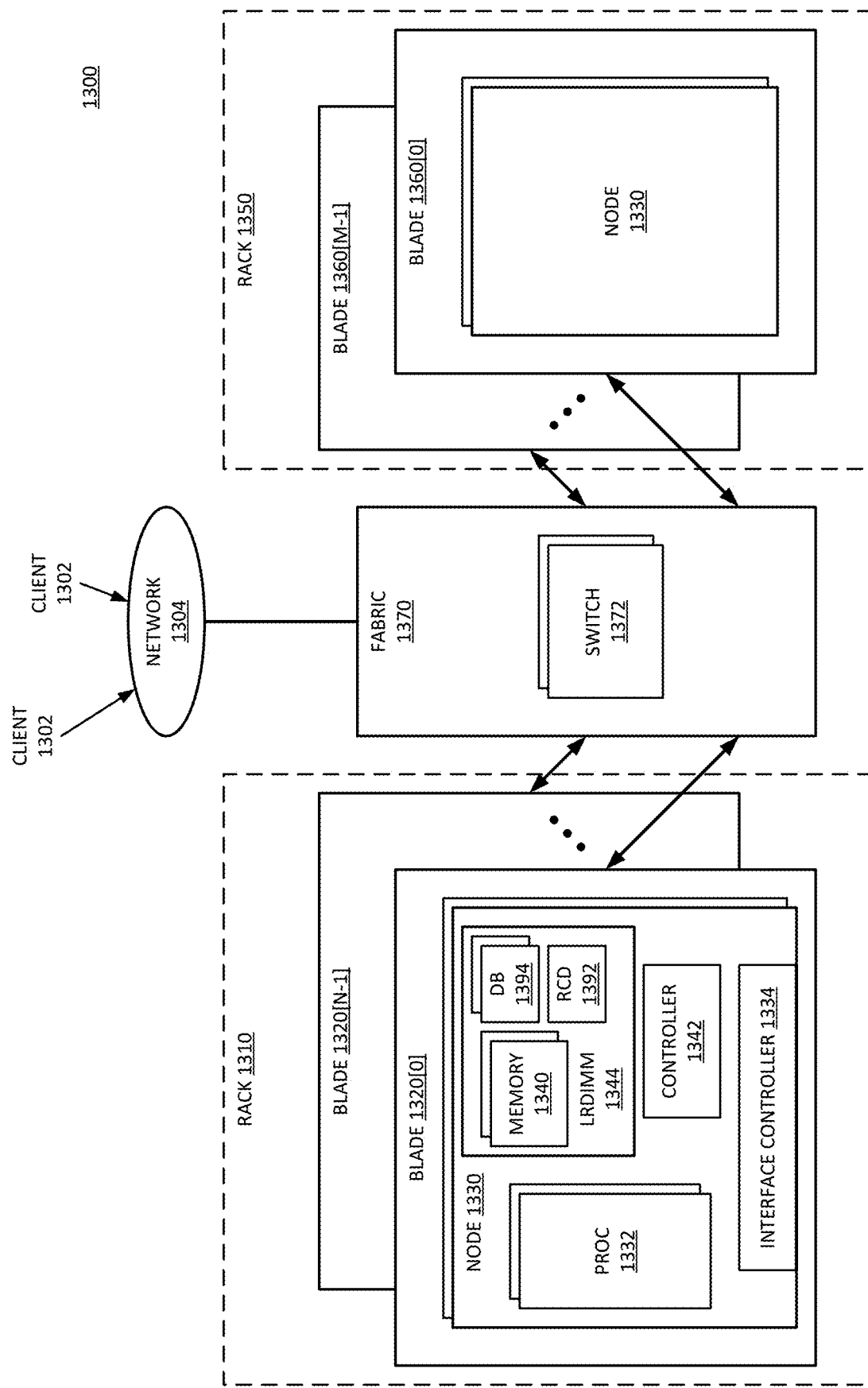
FIG. 13 is a block diagram of an example of a multi-node network in which BCOM communication can be implemented.

FIG. 13 is a block diagram of an example of a multi-node network in which BCOM communication can be implemented. System 1300 represents a network of nodes that can apply adaptive ECC. In one example, system 1300 represents a data center. In one example, system 1300 represents a server farm. In one example, system 1300 represents a data cloud or a processing cloud.

Node 1330 represents a system in accordance with an example of system 100, system 500, or system 802. In one example, node 1330 includes LRDIMM 1344 with memory devices represented by memory 1340, data buffers represented by DB 1394, and a registered clock driver represented by RCD 1392. RCD 1392 represents a registered clock driver in accordance with any example herein, and DBs 1394 represent data buffers in accordance with any example herein. DBs 1394 buffer data transfer between memory 1340 and memory controller 1342. RCD 1392 can control the operation of DBs 1394 through a BCOM bus. In one example, RCD 1392 manages memory 1340 as multiple pseudo channels and controls the data buffers for data access commands in accordance with first and second BCOM command formats, in accordance with any example herein.

One or more clients 1302 make requests over network 1304 to system 1300. Network 1304 represents one or more local networks, or wide area networks, or a combination. Clients 1302 can be human or machine clients, which generate requests for the execution of operations by system 1300. System 1300 executes applications or data computation tasks requested by clients 1302.

In one example, system 1300 includes one or more racks, which represent structural and interconnect resources to house and interconnect multiple computation nodes. In one example, rack 1310 includes multiple nodes 1330. In one example, rack 1310 hosts multiple blade components 1320. Hosting refers to providing power, structural or mechanical support, and interconnection. Blades 1320 can refer to computing resources on printed circuit boards (PCBs), where a PCB houses the hardware components for one or more nodes 1330. In one example, blades 1320 do not include a chassis or housing or other "box" other than that provided by rack 1310. In one example, blades 1320 include housing with exposed connector to connect into rack 1310. In one example, system 1300 does not include rack 1310, and each blade 1320 includes a chassis or housing that can stack or otherwise reside in close proximity to other blades and allow interconnection of nodes 1330.

System 1300 includes fabric 1370, which represents one or more interconnectors for nodes 1330. In one example, fabric 1370 includes multiple switches 1372 or routers or other hardware to route signals among nodes 1330. Additionally, fabric 1370 can couple system 1300 to network 1304 for access by clients 1302. In addition to routing equipment, fabric 1370 can be considered to include the cables or ports or other hardware equipment to couple nodes 1330 together. In one example, fabric 1370 has one or more associated protocols to manage the routing of signals through system 1300. In one example, the protocol or protocols is at least partly dependent on the hardware equipment used in system 1300.

As illustrated, rack 1310 includes N blades 1320. In one example, in addition to rack 1310, system 1300 includes rack 1350. As illustrated, rack 1350 includes M blades 1360. M is not necessarily the same as N; thus, it will be understood that various different hardware equipment components could be used, and coupled together into system 1300 over fabric 1370. Blades 1360 can be the same or similar to blades 1320. Nodes 1330 can be any type of node and are not necessarily all the same type of node. System 1300 is not limited to being homogenous, nor is it limited to not being homogenous.

For simplicity, only the node in blade 1320[0] is illustrated in detail. However, other nodes in system 1300 can be the same or similar. At least some nodes 1330 are computation nodes, with processor (proc) 1332 and memory 1340. A computation node refers to a node with processing resources (e.g., one or more processors) that executes an operating system and can receive and process one or more tasks. In one example, at least some nodes 1330 are server nodes with a server as processing resources represented by processor 1332 and memory 1340. A storage server refers to a node with more storage resources than a computation node, and rather than having processors for the execution of tasks, a storage server includes processing resources to manage access to the storage nodes within the storage server.

In one example, node 1330 includes interface controller 1334, which represents logic to control access by node 1330 to fabric 1370. The logic can include hardware resources to interconnect to the physical interconnection hardware. The logic can include software or firmware logic to manage the interconnection. In one example, interface controller 1334 is or includes a host fabric interface, which can be a fabric interface in accordance with any example described herein.

Processor 1332 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory 1340 can be or include memory devices 1340 coupled to memory controller 1342 to control host access to memory devices 1340.

In general with respect to the descriptions herein, in one example an apparatus includes: a buffer communication (BCOM) bus interface to couple to a BCOM bus, the BCOM bus to provide commands to a data buffer that is to buffer a data bus for memory devices of a first pseudo channel and a second pseudo channel; a controller to send a first BCOM command on the BCOM bus to the data buffer to control data transfer for the first pseudo channel, the first BCOM command to specify a rank and a burst length for the first pseudo channel; and to send a second BCOM command on the BCOM bus to the data buffer to control data transfer for the second pseudo channel, the second BCOM command to specify a rank and a burst length for the second pseudo channel, and a timing offset relative to the first BCOM command.

In one example of the apparatus, the timing offset of the second BCOM command comprises two bits of delay code. In accordance with any preceding example of the apparatus, in one example, the second BCOM command comprises a command having exactly two clock cycles of separation from the first BCOM command. In accordance with any preceding example of the apparatus, in one example, for a BCOM command to be sent subsequent to the first BCOM command at other than two clock cycles of separation from the first BCOM command, the subsequent BCOM command is to specify a rank and a burst length without including the timing offset. In accordance with any preceding example of the apparatus, in one example, the first BCOM command is to specify a read command, and the data buffer is to infer the second BCOM command to be directed to a read command, based on the read command specified in the first BCOM command. In accordance with any preceding example of the apparatus, in one example, the first BCOM command is to specify a write command, and the data buffer is to infer the second BCOM command to be directed to a write command, based on the write command specified in the first BCOM command. In accordance with any preceding example of the apparatus, in one example, the first BCOM command is to specify either the first pseudo channel or the second pseudo channel, and the data buffer is to infer the second BCOM command to be directed to the pseudo channel specified by the first BCOM command. In accordance with any preceding example of the apparatus, in one example, the data buffer is one of multiple data buffers for the first pseudo channel. In accordance with any preceding example of the apparatus, in one example, the data buffer is one of multiple data buffers for the second pseudo channel.

In general with respect to the descriptions herein, in one example a method for data buffer management includes: sending a first buffer communication (BCOM) command on a BCOM bus to a data buffer, the first BCOM command specifying a rank and a burst length for a first pseudo channel; and sending a second BCOM command on the BCOM bus to the data buffer, the second BCOM command specifying a rank and a burst length for a second pseudo channel, and a timing offset relative to the first BCOM command.

In one example of the method, the timing offset of the second BCOM command comprises two bits of delay code. In accordance with any preceding example of the method, in one example, sending the second BCOM command comprises sending the second BCOM command with exactly two clock cycles of separation from the first BCOM command. In accordance with any preceding example of the method, in one example, the method includes: inferring that the second BCOM command is directed to a same type of data access command specified in the first BCOM command. In accordance with any preceding example of the method, in one example, the method includes: inferring that the second BCOM command is directed to a same pseudo channel indicated in the first BCOM command.

In general with respect to the descriptions herein, in one example a system includes: a registered clock driver (RCD) of a memory module; dynamic random access memory (DRAM) devices on the memory module, the DRAM devices addressed as a first pseudo channel and a second pseudo channel; and a data buffer of the memory module coupled to the RCD on a buffer communication (BCOM) bus, the data buffers to buffer a data bus between the DRAM devices and a host memory controller; wherein the data buffer is to receive a first BCOM command on the BCOM bus specifying a rank and a burst length for the first pseudo channel and to receive a second BCOM command specifying a rank and a burst length for the second pseudo channel, the second BCOM command including a timing offset relative to the first BCOM command.

In one example of the system, the second BCOM command comprises a command having exactly two clock cycles of separation from the first BCOM command. In accordance with any preceding example of the system, in one example, the data buffer is to infer a command type of the second BCOM command based on a type of the first BCOM command. In accordance with any preceding example of the system, in one example, the data buffer is to infer a pseudo channel indicated by the second BCOM command based on a pseudo channel indicated by the first BCOM command. In accordance with any preceding example of the system, in one example, the data buffer is one of multiple data buffers for the first pseudo channel and one of multiple data buffers for the second pseudo channel. In accordance with any preceding example of the system, in one example, the system includes one or more of: a host processor coupled to the memory module; a display communicatively coupled to a host processor; a network interface communicatively coupled to a host processor; or a battery to power the system.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus comprising:
a buffer communication (BCOM) bus interface to couple to a BCOM bus, the BCOM bus to provide commands to a data buffer that is to buffer a data bus for memory devices of a first pseudo channel and a second pseudo channel;

a controller
- to send a first BCOM command on the BCOM bus to the data buffer to control data transfer for the first pseudo channel, the first BCOM command to specify a rank and a burst length for the first pseudo channel; and
- to send a second BCOM command on the BCOM bus to the data buffer to control data transfer for the second pseudo channel, the second BCOM command to specify a rank and a burst length for the second pseudo channel, and a timing offset relative to the first BCOM command.

2. The apparatus of claim 1, wherein the timing offset of the second BCOM command comprises two bits of delay code.

3. The apparatus of claim 1, wherein the second BCOM command comprises a command having exactly two clock cycles of separation from the first BCOM command.

4. The apparatus of claim 3, wherein for a BCOM command to be sent subsequent to the first BCOM command at other than two clock cycles of separation from the first BCOM command, the second BCOM command is to specify a rank and a burst length without including the timing offset.

5. The apparatus of claim 1, wherein the first BCOM command is to specify a read command, and the data buffer is to infer the second BCOM command to be directed to a read command, based on the read command specified in the first BCOM command.

6. The apparatus of claim 1, wherein the first BCOM command is to specify a write command, and the data buffer is to infer the second BCOM command to be directed to a write command, based on the write command specified in the first BCOM command.

7. The apparatus of claim 1, wherein the first BCOM command is to specify either the first pseudo channel or the second pseudo channel, and the data buffer is to infer the second BCOM command to be directed to the pseudo channel specified by the first BCOM command.

8. The apparatus of claim 1, wherein the data buffer is one of multiple data buffers for the first pseudo channel.

9. The apparatus of claim 1, wherein the data buffer is one of multiple data buffers for the second pseudo channel.

10. A method for data buffer management, comprising:
sending a first buffer communication (BCOM) command on a BCOM bus to a data buffer, the first BCOM command specifying a rank and a burst length for a first pseudo channel; and
sending a second BCOM command on the BCOM bus to the data buffer, the second BCOM command specifying a rank and a burst length for a second pseudo channel, and a timing offset relative to the first BCOM command.

11. The method of claim 10, wherein the timing offset of the second BCOM command comprises two bits of delay code.

12. The method of claim 10, wherein sending the second BCOM command comprises sending the second BCOM command with exactly two clock cycles of separation from the first BCOM command.

13. The method of claim 10, further comprising:
inferring that the second BCOM command is directed to a same type of data access command specified in the first BCOM command.

14. The method of claim 10, further comprising:
inferring that the second BCOM command is directed to a same pseudo channel indicated in the first BCOM command.

15. A system comprising:
a registered clock driver (RCD) of a memory module;
dynamic random access memory (DRAM) devices on the memory module, the DRAM devices addressed as a first pseudo channel and a second pseudo channel; and
a data buffer of the memory module coupled to the RCD on a buffer communication (BCOM) bus, the data buffer to buffer a data bus between the DRAM devices and a host memory controller;
wherein the data buffer is to receive a first BCOM command on the BCOM bus specifying a rank and a burst length for the first pseudo channel and to receive a second BCOM command specifying a rank and a burst length for the second pseudo channel, the second BCOM command including a timing offset relative to the first BCOM command.

16. The system of claim 15, wherein the second BCOM command comprises a command having exactly two clock cycles of separation from the first BCOM command.

17. The system of claim 15, wherein the data buffer is to infer a command type of the second BCOM command based on a type of the first BCOM command.

18. The system of claim 15, wherein the data buffer is to infer a pseudo channel indicated by the second BCOM command based on a pseudo channel indicated by the first BCOM command.

19. The system of claim 15, wherein the data buffer is one of multiple data buffers for the first pseudo channel and one of multiple data buffers for the second pseudo channel.

20. The system of claim 15, including one or more of:
a host processor coupled to the memory module;
a display communicatively coupled to a host processor;
a network interface communicatively coupled to a host processor; or
a battery to power the system.

* * * * *